US012785399B2

(12) United States Patent
Schlak et al.

(10) Patent No.: US 12,785,399 B2
(45) Date of Patent: Nov. 3, 2026

(54) POWER DISTRIBUTION UNIT WITH PHASE REDUNDANCY

(71) Applicant: International Business Machines Corporation, Armonk, NY (US)

(72) Inventors: Robert B. Schlak, Hyde Park, NY (US); Enver Candan, Fishkill, NY (US); Brian Charles Tucker, Hyde Park, NY (US); Michael Joshua Arlan, Poughkeepsie, NY (US)

(73) Assignee: INTERNATIONAL BUSINESS MACHINES CORPORATION, Amork, NY (US)

( * ) Notice: Subject to any disclaimer, the term of this patent is extended or adjusted under 35 U.S.C. 154(b) by 225 days.

(21) Appl. No.: 18/049,800

(22) Filed: Oct. 26, 2022

(65) Prior Publication Data

US 2024/0146063 A1 May 2, 2024

(51) Int. Cl.
*H02J 3/26* (2026.01)
*H02M 7/217* (2006.01)

(52) U.S. Cl.
CPC ............. *H02J 3/26* (2013.01); *H02M 7/2173* (2013.01)

(58) Field of Classification Search
CPC ................................ H02J 3/26; H02M 7/2173
USPC ............................................................ 307/18
See application file for complete search history.

(56) References Cited

U.S. PATENT DOCUMENTS

| | | | |
|---|---|---|---|
| 9,373,956 | B2 | 6/2016 | Jansma |
| 9,450,482 | B2 | 9/2016 | Drummond et al. |
| 9,891,679 | B2 | 2/2018 | Phadke et al. |
| 9,893,644 | B1 | 2/2018 | Ahladas et al. |
| 10,277,030 | B2 | 4/2019 | Dozier et al. |
| 10,481,626 | B1 | 11/2019 | Tang et al. |
| 10,608,435 | B2 | 3/2020 | Fluman et al. |
| 10,658,920 | B2 | 5/2020 | He et al. |
| 10,739,803 | B1 | 8/2020 | Miller et al. |
| 10,784,771 | B2 | 9/2020 | Sreenivas |
| 10,790,563 | B1 | 9/2020 | Schwab et al. |
| 10,958,175 | B2 | 3/2021 | Egan et al. |
| 2010/0264731 | A1 | 10/2010 | Arimilli |
| 2020/0067311 | A1 | 2/2020 | Vardharajan |

(Continued)

OTHER PUBLICATIONS

Carlos et al.; "Alternative Breed of Three-Phase Four-Wire Shunt . . . With Single DC Link", TIA IEEE Transactions On, vol. 54, Issue 3, pp. 2492-2505, May-Jun. 2018.

(Continued)

*Primary Examiner* — Hal Kaplan

(74) *Attorney, Agent, or Firm* — Tihon Poltavets, Esq; Kevin P. Radigan, Esq.; Heslin Rothenberg Farley & Mesiti P.C.

(57) ABSTRACT

A power distribution unit (PDU) of a disclosed embodiment comprises a configurable PDU architecture providing phase redundancy. The configurable PDU architecture comprises a switch bank having power inputs Phase A, Phase B, Phase C, and Neutral and providing respective phase outputs to respective connected loads. A switching control receives sense inputs and provides configuration controls to the switch bank. The switch bank switches in an alternate phase input when a primary phase fails providing phase redundancy and continued reliable operations with the loss of a single input phase. The PDU of one or more disclosed embodiments enables universal input power configurations including Single phase, Delta, and Wye configurations.

20 Claims, 16 Drawing Sheets

(56) References Cited

U.S. PATENT DOCUMENTS

| | | | |
|---|---|---|---|
| 2020/0099218 | A1 | 3/2020 | Adams |
| 2021/0203241 | A1 | 7/2021 | Steinberg |

OTHER PUBLICATIONS

White et al.; "Configuring Systems for Operation From Three-Phase AC Power", Journal of Electronics World, pp. 25-28, Apr. 8, 2007.
Shi et al.; "Performance Assessment of Triple Redundant Nine-Phase Delta- and Wye-Connected . . . and Fault Conditions", IET Journal of, pp. 3563-3567, Apr. 30, 2019.
Kumar et al.; "A Structure for Three-Phase Four-Wire Distribution System . . . Power Quality Conditioner (UPQC)", IJERA Journal of, vol. 4, Iss. 2, pp. 27-33, Feb. 2014.
He et al.; "A Fault-Tolerant T-Type Multilevel Inverter Topology With Increased . . . Soft-Switching Characteristics", Marquette University, pp. 1-30, Feb. 7, 2017.
Schneider Electric "APC Next Generation Rack ATS (AP44xx series): Power redundancy for single corded equipment," Date Accessed: Sep. 22, 2022, pp. 1-4.

| MODE | DELTA | WYE |
|---|---|---|
| Normal | A B | A N |
| A Failed | C B | C N or N B |
| B Failed | A C | A N or C N |
| C Failed | A B | A N or N B |

| MODE | DELTA | WYE |
|---|---|---|
| Normal | B C | B N |
| A Failed | B C | B N or N C |
| B Failed | A C | A N or N C |
| C Failed | B A | B N or A N |

| MODE | DELTA | WYE |
|---|---|---|
| Normal | C A | C N |
| A Failed | C B | C N or B N |
| B Failed | C A | C N or N A |
| C Failed | B A | B N or N A |

| MODE | DELTA | WYE |
|---|---|---|
| Normal | A B | A N |
| A Failed | C B | C N or N B |
| B Failed | A C | A N or C N |
| C Failed | A B | A N or N B |

| MODE | DELTA | WYE |
|---|---|---|
| Normal | B C | B N |
| A Failed | B C | B N or N C |
| B Failed | A C | A N or N C |
| C Failed | B A | B N or A N |

| MODE | DELTA | WYE |
|---|---|---|
| Normal | C A | C N |
| A Failed | C B | C N or B N |
| B Failed | C A | C N or N A |
| C Failed | B A | B N or N A |

POWER DISTRIBUTION UNIT WITH PHASE REDUNDANCY

BACKGROUND

The present invention relates to power distribution units, and more specifically, to providing phase redundancy within power distribution units.

Power Distribution Units (PDUs) are used to provide power to attached electrical equipment. In a data center, the equipment can include computers, peripherals, and computer cooling equipment. In known PDUs, the loss of a single input phase causes loss of power to a portion of the attached equipment. Very high availability is needed for various applications, such as data centers. PDU usage is increasing and greater reliability is desired for new PDUs, than possible in current PDUs.

SUMMARY

According to embodiments of the disclosure, phase redundancy is provided within a power distribution unit (PDU). The PDU comprises a configurable PDU architecture providing phase redundancy. The configurable PDU architecture comprises a switch bank having power inputs Phase A, Phase B, Phase C, and Neutral and providing respective phase outputs to respective connected loads. A switching control receives sense inputs and provides configuration controls to the switch bank. The switch bank is operatively controlled to switch in an alternate input phase when a primary phase fails, providing phase redundancy and continued reliable operations with the loss of a single input phase. The PDU of one or more disclosed embodiments enables universal input power configurations including Single phase, Delta, and Wye configurations.

DETAILED DESCRIPTION

In accordance with embodiments of the disclosure, an enhanced power distribution unit (PDU) enables switching in alternate input phases when a primary phase fails to provide phase redundancy and supports universal input voltage configurations including Single phase, Delta, and Wye input voltage configurations. The PDU of the disclosed embodiments improves fault tolerance and robustness of power distribution, increases flexibility, and simplifies requirements of attached systems and downstream power supply designs. The PDU in one or more embodiments of the disclosure optimizes power delivery during redundancy phase switching and during phase balancing switching. The PDU of the disclosed embodiments optionally is configured to automatically connect to either Delta or Wye input voltage configurations. The PDU also supports power input connections of an AC Universal Power Supply (UPS) or a DC Battery.

The PDU in one or more embodiments of the disclosure comprises a configurable PDU architecture providing phase redundancy. The configurable PDU architecture includes a switch bank having power inputs Phase A, Phase B, Phase C, and Neutral. The switch bank further includes power outputs connected to an associated or connected load. A switch control receives sense inputs from the switch bank and provides configuration and switching controls to the switch bank. The switch bank includes switches that are operatively controlled to switch in an alternate input phase when a primary phase fails, providing phase redundancy and reliable operations with the loss of the single input phase. The PDU in one or more disclosed embodiments enables universal input power configurations including Single phase, Delta, and Wye configurations.

Figure 1:
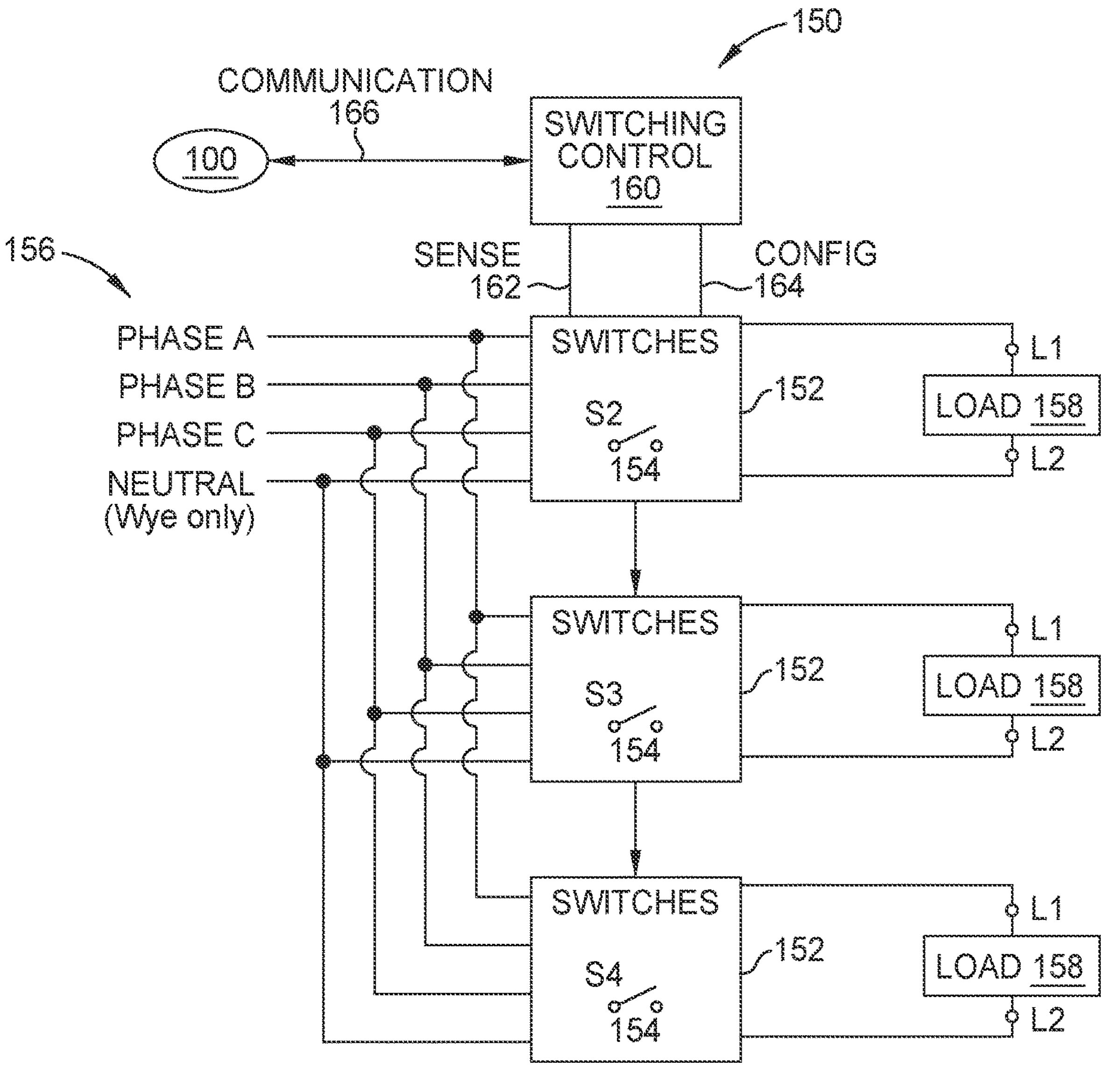
FIG. 1 illustrates a power distribution unit (PDU) in accordance with one or more disclosed embodiments supporting universal input power configurations and providing power to attached electrical equipment.

Having reference to FIG. 1, shown is an enhanced PDU 150 in accordance with a disclosed embodiment. PDU 150 provides phase redundancy by switching in alternate phases from a single input power source, responsive to the loss of an input phase, enabling continued reliable operations of the PDU 150.

PDU 150 comprises a configurable PDU architecture, which includes a selected number of switch banks 152 (three shown). Each switch bank 152 includes a selected number of switching elements (SEs) 154 that are controlled to provide phase redundancy, switching and configuration operations by PDU 150. As shown, a plurality of power inputs 156 coupled to each of the switch banks 152 includes Phase A, Phase B, Phase C, and Neutral inputs, 156. PDU 150 supports universal input power configurations including Single phase, Delta, and Wye. With the input power Wye-configuration, the Neutral input 156 is used.

As shown, a load 158 is connected to each of the switch bank 152, while it should be understood that a selected, variable number of loads 158 could be connected to the switch banks 152. The switch bank 152 of the configurable PDU architecture can be implemented with various types of electrical switching devices SEs, 154. For example, the electrical switching devices SEs, 154 can be implemented using relays as the electrical switching devices, which comprise a break-before-make relay type. The switch bank 152 can be implemented with solid state switching devices SEs, 154, such as Triac switching devices, Insulated Gate Bipolar Transistor (IGBT) switching devices, and Metal Oxide Semiconductor Field Effect Transistor (MOSFET) switching devices. Using solid state switching devices SEs, 154 in switch bank 152 enables multiple control options, such as Zero Voltage Switching (ZVS) and inrush control.

A switching control 160 receives sense inputs 162 from the switch banks 152 and applies switching and configuration controls 164 to the switch banks 152. Switching control 160 performs methods of the disclosed embodiments, including control of switching devices SEs, 154 of the switch banks 152. Switching control 160 automatically configures Delta, and Wye configurations responsive to comparing the line-to-line or line-to-neutral voltage with a selected programmable threshold value. Switching control 160 controls phase redundancy and provides selected control functions of configurable PDU 150. For example, the switching control logic 160 operatively controls switching elements SEs 154 of the switch banks 152 responsive to the sense inputs. The switching control 160 controls the switch banks 152 to switch in an alternate power phase input, responsive to a primary input phase failure. Switching control 160 implements phase redundancy and reliable continued operations with the loss of the single input phase to PDU 150. Example phase redundancy and control operations performed by the switch control logic 160 are illustrated and described with respect to FIGS. 8 and 9.

The switching control 160 can be implemented with hardware logic, computer program product logic, and combinations of hardware logic and computer program product logic. The switching control 160 implements selected control functions and operations for respective embodiments of the configurable phase switching architecture of the PDU 150, for example as illustrated and described in FIGS. 2-7.

The reconfigurable PDU 150 enables multiple phase switching architectures of disclosed embodiments, such as illustrated and described with respect to FIGS. 2-7. The illustrated different phase switching architectures allow selection of options based upon simplicity, cost, features, and functions for the PDU 150.

Figure 16:
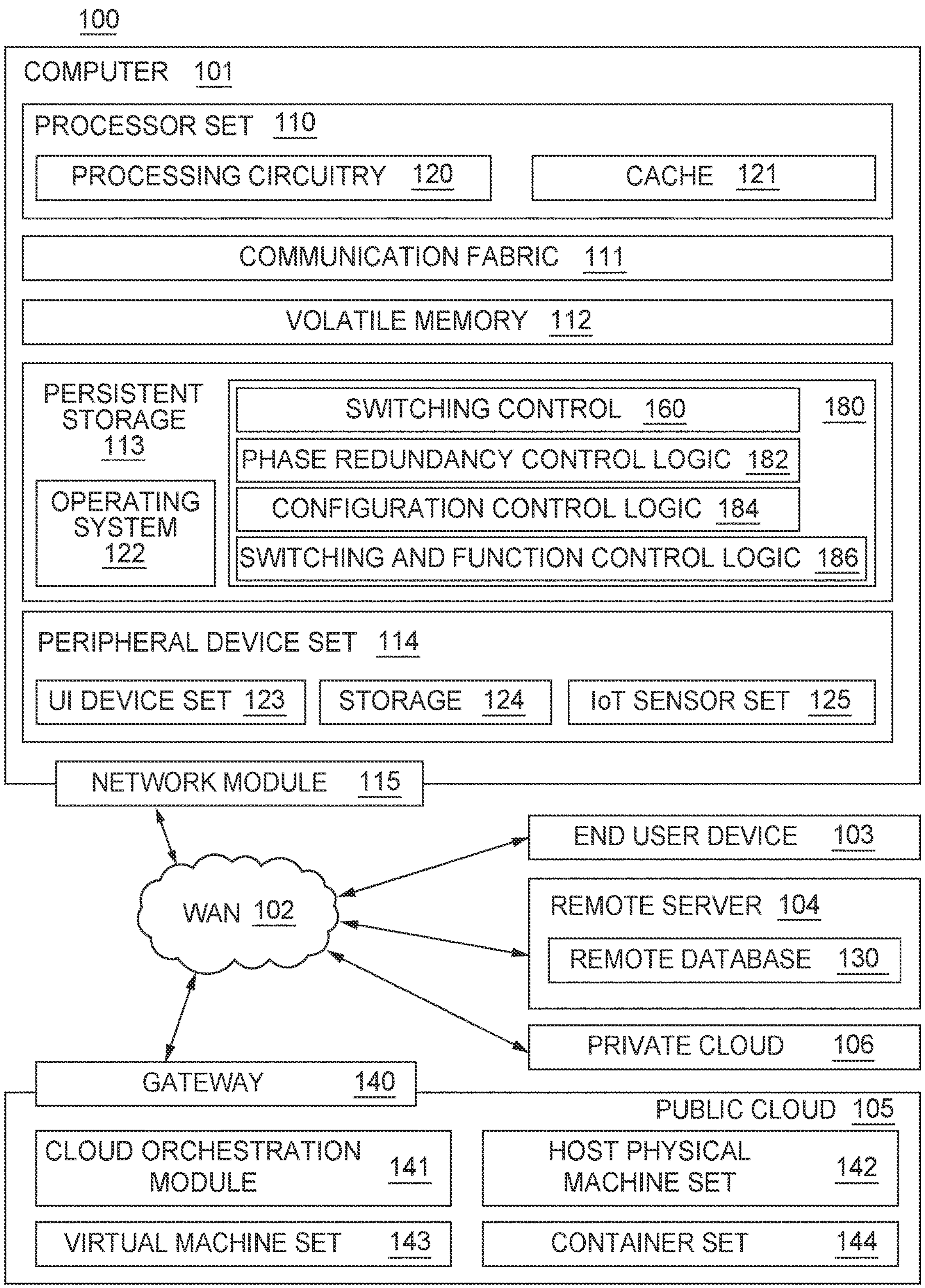
FIG. 16 is a schematic and block diagram illustrating an example computer environment for use in conjunction with disclosed embodiments of PDU of FIG. 1.

Switching control 160 includes a communications connection 166 with a remote computing environment 100, such as illustrated and described with respect to FIG. 16. Switching control 160 can communicate with the remote computing environment 100, for example supporting remote computer-based logging, telemetry, and external configuration.

Figure 2:
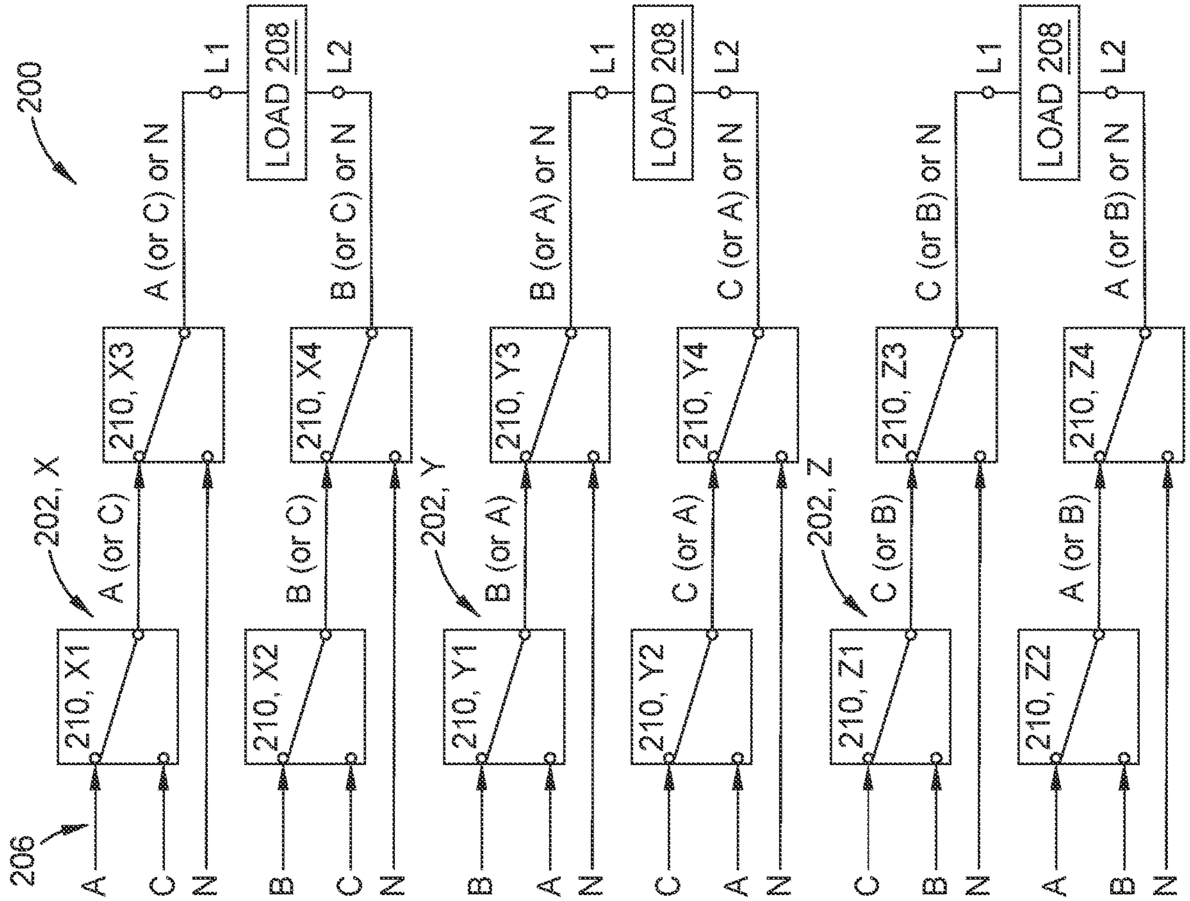
FIG. 2 is a schematic and block diagram illustrating a phase switching architecture of the PDU of FIG. 1 of a disclosed embodiment.

Referring to FIG. 2, shown is a three-phase switching architecture 200 of the PDU 150 of a disclosed embodiment. Phase switching architecture 200 provides phase redundancy by switching in an alternate input phase when a primary input phase fails. As shown, phase switching architecture 200 includes three switch banks 202, X, Y, Z. Each switch bank 202, X, Y, Z includes power phase inputs 206, Phase A, Phase B, Phase C, and a Neutral (N) input and provides respective PDU outputs, L1, L2 connected to a respective load 208. In this example, each of the switch banks 202, X, Y, Z of phase switching architecture 200 comprises single-pole, double-throw (SPDT) switches 210. Phase switching architecture 200 supports universal power configurations including Delta and Wye input voltage configurations. As shown, each switch bank 202, X, Y, Z includes four respective SPDT switches 210, X1-X4; 210, Y1-Y4; and 210, Z1-Z4. Each switch banks 202, X, Y, Z includes an optional SPDT switch 210, X3, 210, Y3, and 210, Z3 that can be provided to allow enhanced phase balancing operations. The illustrated phase switching architecture 200 includes three switch banks 202, X, Y, Z respectively supporting one load 208; however, another number of switch banks 202 is possible and with each switch bank 202 including a different number of load connections.

In a normal operational mode, switch bank 202, X connects phase lines A, B to respective PDU outputs, L1, L2 with a Delta power configuration, and connects phase line A and neutral input N to respective PDU outputs, L1, L2 with a Wye power configuration. Switch bank 202, Y connects phase lines B, C to respective PDU outputs, L1, L2 with a Delta power configuration, and connects phase line B and neutral input N to respective PDU outputs, L1, L2 with a Wye power configuration. Switch bank 202, Z connects phase lines C, A to respective PDU outputs, L1, L2 with a Delta power configuration, and connects phase line C and neutral input N to respective PDU outputs, L1, L2 with a Wye power configuration.

In an operational mode with a phase input A failure, switch bank 202, X connects phase lines C, B to respective PDU outputs, L1, L2 with a Delta power configuration, and connects phase line C and neutral input N, or alternatively connects neutral input N and phase line B, to respective PDU outputs, L1, L2 with a Wye power configuration. Switch bank 202, Y connects phase lines B, C to respective PDU outputs, L1, L2 with a Delta power configuration, and connects phase line B and neutral input N, or alternatively connects neutral input N and phase line C, to respective PDU outputs, L1, L2 with a Wye power configuration. Switch bank 202, Z connects phase lines C, B to respective PDU outputs, L1, L2 with a Delta power configuration, and connects phase line C and neutral input N, or alternatively connects phase line B and neutral input N, to respective PDU outputs, L1, L2 with a Wye power configuration.

In an operational mode with a phase input B failure, switch bank 202, X connects phase lines A, C to respective PDU outputs, L1, L2 with a Delta power configuration, and connects phase line A and neutral input N, or alternatively connects phase line C and neutral input N, to respective PDU outputs, L1, L2 with a Wye power configuration.

Switch bank 202, Y connects phase lines A, C to respective PDU outputs, L1, L2 with a Delta power configuration, and connects phase line A and neutral input N, or alternatively connects neutral input N and phase line C, to respective PDU outputs, L1, L2 with a Wye power configuration. Switch bank 202, Z connects phase lines C, A to respective PDU outputs, L1, L2 with a Delta power configuration, and connects phase line C and neutral input N, or alternatively connects neutral input N and phase line A to respective PDU outputs, L1, L2 with a Wye power configuration.

In an operational mode with a phase input C failure, switch bank 202, X connects phase lines A, B to respective PDU outputs, L1, L2 with a Delta power configuration, and connects phase line A and neutral input N, or alternatively connects neutral input N and phase line B, to respective PDU outputs, L1, L2 with a Wye power configuration. Switch bank 202, Y connects phase lines B, A to respective PDU outputs, L1, L2 with a Delta power configuration, and connects phase line B and neutral input N, or alternatively connects phase line A and neutral input N, to respective PDU outputs, L1, L2 with a Wye power configuration. Switch bank 202, Z connects phase lines B, A to respective PDU outputs, L1, L2 with a Delta power configuration, and connects phase line B and neutral input N, or alternatively connects neutral input N and phase line A, to respective PDU outputs, L1, L2 with a Wye power configuration.

Figure 3:
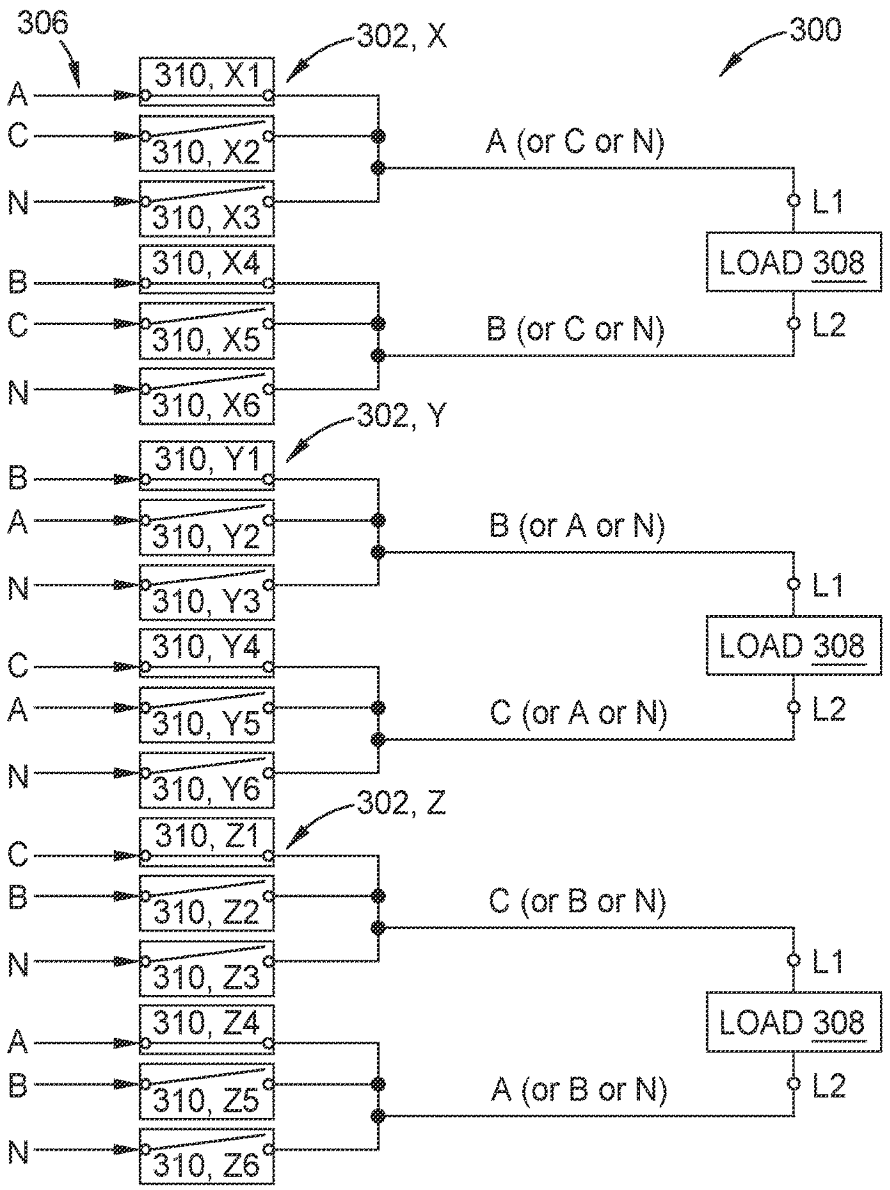
FIG. 3 is a schematic and block diagram illustrating another phase switching architecture of the PDU of FIG. 1 of a disclosed embodiment.

Referring to FIG. 3, shown is a three-phase switching architecture 300 of the PDU 150 of another disclosed embodiment. Phase switching architecture 300 similarly provides phase redundancy, switches in an alternate input phase when a primary input phase fails. As shown, phase switching architecture 300 includes three switch bank 302, X, Y, Z. Each switch bank 302, X, Y, Z includes power phase inputs 306, Phase A, Phase B, Phase C, and a Neutral (N) input and provides respective PDU outputs, L1, L2 connected to a respective load 308.

The illustrated phase switching architecture 300 includes three switch banks 302, X, Y, Z respectively supporting one load 308; however, another variable number of switch banks 302 is possible and with each switch bank 302 supporting a variable number of load connections 158. In this example, each of the switch bank 302, X, Y, Z of phase switching architecture 300 comprises single-pole, single-throw (SPST) switches 310. Phase switching architecture 300 supports universal power configurations including Delta, and Wye input voltage configurations. As shown, each switch bank 302, X, Y, Z includes six respective SPST switches 310, X1-X6; 310, Y1-Y6; and 310, Z1-Z6. Each switch bank 302, X, Y, Z includes an optional SPST switch 310, X3, 310, Y3, and 310, Z3 optionally provided to allow enhanced phase balancing operations.

The phase redundancy switching operational modes of phase switching architecture 300 switches in an alternate input phase when a primary input phase fails. In a normal operational mode, an operational modes with a phase input A failure, an operational mode with a phase input B failure, and an operational mode with a phase input C failure, switch banks 302, X, Y, and Z provide the same phase redundancy switching operations as described for phase switching architecture 200.

The switch banks 302, X, Y, and Z of phase switching architecture 300 provide the same connections to respective PDU outputs, L1, L2 as illustrated and described above with respect to the switch bank 202, X, switch bank 202, Y, and switch bank 202, Z of phase switching architecture 200 for both Delta and Wye power configurations.

The illustrated phase switching architecture 300 includes three switch banks 302, X, Y, Z, each including five or six SPST switches 310 per switch bank, which is the highest number of switches among the disclosed embodiments. In phase switching architecture 300, only one SPST switch 310 per switch leg is used in series with the load 308, which can decrease power losses for example as compared to the phase switching architecture 200.

Figure 4:
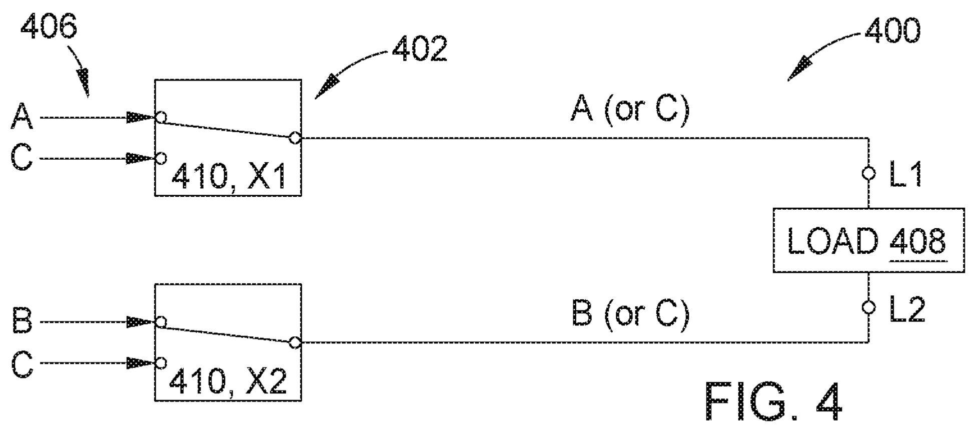
FIG. 4 is a schematic and block diagram illustrating another phase switching architecture of the PDU of FIG. 1 of a disclosed embodiment.

Referring to FIG. 4, shown is a phase switching architecture 400 of the PDU 150 of another disclosed embodiment. Phase switching architecture 400 similarly provides phase redundancy, switches in an alternate input phase when a primary input phase fails. Phase switching architecture 400 supports a Delta line-to-line input voltage configuration. Phase switching architecture 400 comprises SPDT switches, which comprise relays of break-before-make switch type. As shown, phase switching architecture 400 includes a switch bank 402 including two SPDT switches 410, X1, and 410, X2. SPDT switch 410, X1 receives power phase inputs 406, Phase A and Phase C, and SPDT switch 410, X2 receives power phase inputs 406, Phase B and Phase C. SPDT switch 410, X1 provides outputs A or C and SPDT switch 410, X2 provides outputs B or C, which are respectively coupled to PDU outputs, L1, L2 connections to a respective load 408. As shown, phase switching architecture 400 includes one switch bank 402 supporting one load connection 408. However, a selected number of switch banks is possible with each switch bank supporting a variable number of load connections.

Redundancy operation of phase switching architecture 400 and switch bank 402 include switching in an alternate input phase when a primary input phase fails, for example providing operations as follows. In a normal operational mode SPDT switch 410, X1 provides output A and SPDT switch 410, X2 provides output B connected to the respective PDU outputs, L1, L2 for the Delta power configuration. In an operational mode with a phase input A failure, SPDT switch 410, X1 provides output C and SPDT switch 410, X2 provides output B connected to the respective PDU outputs, L1, L2. In an operational mode with a phase input B failure, SPDT switch 410, X1 provides output A and SPDT switch 410, X2 provides output B connected to the respective PDU outputs, L1, L2. In an operational mode with a phase input C failure, SPDT switch 410, X1 provides output A and SPDT switch 410, X2 provides output B connected to the respective PDU outputs, L1, L2.

Figure 5:
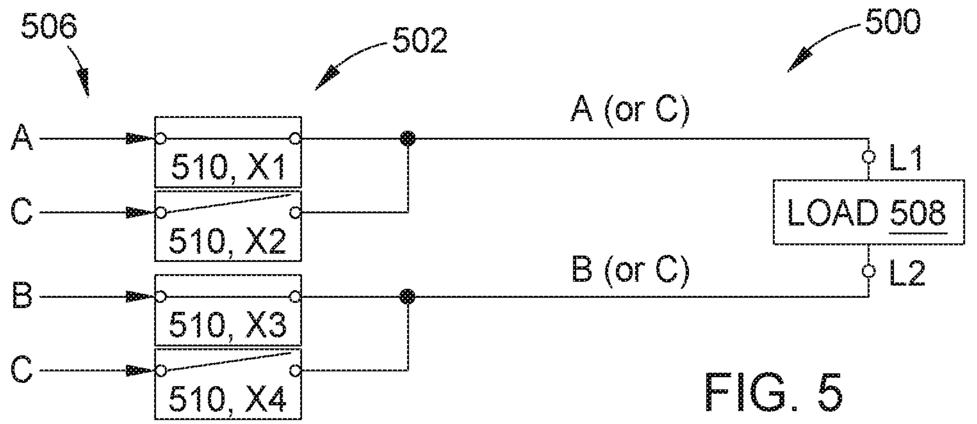
FIG. 5 is a schematic and block diagram illustrating another phase switching architecture of the PDU of FIG. 1 of a disclosed embodiment.

Referring to FIG. 5, shown is a phase switching architecture 500 of the PDU 150 of another disclosed embodiment. Phase switching architecture 500 similarly provides phase redundancy, switches in an alternate input phase when a primary input phase fails. Phase switching architecture 500 supports a Delta line-to-line input voltage configuration. As shown, phase switching architecture 500 includes a switch bank 502 including four switches 510, X1, 510, X3, and 510, X4. In one embodiment, the switches 510 are SPST switches. Examples of SPST switches include solid state switches, such as Triac switches, IGBT switches, or MOSFET switches. SPST switch 510, X1 receives power phase input 506, Phase A. SPST switch 510, X2 receives power phase input 506, Phase C. SPST switch 510, X3 receives power phase input 506, Phase B. SPST switch 510, X4 receives power phase input 506, Phase C. SPST switch 510, X1 and X5 provides an output A or C and SPST switch 510, X3, X4 provides outputs B or C, which are respectively coupled to PDU outputs, L1, L2 connections to a respective load 508. As shown, phase switching architecture 500 includes one switch bank 502 supporting one load 508.

However, a selected number of switch banks 502 is possible with each switch bank supporting a variable number of loads 508.

Redundancy operation of phase switching architecture 500 and switch bank 502 includes switching in an alternate input phase when a primary input phase fails, for example providing operations as follows. In a normal operational mode, SPST switches 510, X1 and X2 provide an output C, and SPST switch 510, X3 and X4 provides an output B or C, coupled to the respective PDU output connections, L1, L2 for the Delta power configuration. In an operational mode with a phase input A failure, SPST switches 510, X1 and X2 provide an output C and SPST switches 510, X3 and X4 provide output B to the respective PDU outputs, L1, L2. In an operational mode with a phase input B failure, SPST switches 510, X1 and X2 provide an output C and SPST switch 510, X3 and X4 provides output B to the respective PDU outputs, L1, L2. In an operational mode with a phase input C failure, SPST switches 510, X1 and X2 provide an output A. and SPST switch 510, X3 and X4 provides output B to the respective PDU outputs, L1, L2.

As shown, phase switching architecture 500 and switch bank 502 provide the same operational modes and outputs to respective PDU connections, L1, L2 as illustrated and described above with respect to the phase switching architecture 400 and switch bank 402 for the Delta input power configuration. The phase switching architecture 400 and switch bank 402 comprise SPDT switches that can be easily implemented with relays. The phase switching architecture 500 and switch bank 502 comprise SPST switches that can be implemented with most switch technologies. The SPST switches 510, X1-X4 of phase switching architecture 500 and switch bank 502 comprise SPST switches comprise solid state switches, which enable additional configuration control options.

Figure 6:
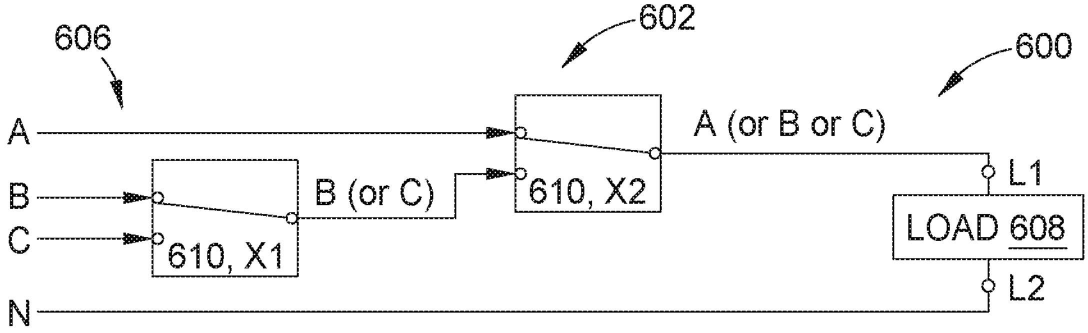
FIG. 6 is a schematic and block diagram illustrating another phase switching architecture of the PDU of FIG. 1 of a disclosed embodiment.

Referring to FIG. 6, shown is a phase switching architecture 600 of the PDU 150 of another disclosed embodiment. Phase switching architecture 600 similarly provides phase redundancy, switches in an alternate input phase when a primary input phase fails. As shown, phase switching architecture 600 includes configurable phase switching architecture 600 supporting a Wye (line-to-neutral) input voltage configuration or a Single Phase input. Phase switching architecture 600 comprise SPDT switches, SPDT switches comprise relays of break-before-make switch type. As shown, phase switching architecture 600 includes a switch bank 602 including two SPDT switches 610, X1, and 610, X2. SPDT switch 610, X2 receives power phase inputs 606, Phase B, and Phase C. SPDT switch 610, X2 receives power phase input 606, Phase A and the output of SPDT switch 610, X1, which provides an output of B or C. SPDT switch 610, X2 provides an output A or B or C, which is connected to PDU output, L1, and Neutral N is coupled to PDU output L2 connections to a respective load 608. As shown, phase switching architecture 600 includes one switch bank 602 supporting one load connection 608. However, a selected number of switch banks is possible with each switch bank supporting a variable number of load connections.

Redundancy operation of phase switching architecture 600 and switch bank 602 includes switching in an alternate input phase when a primary input phase fails, for example providing operations as follows. In a normal operational mode SPDT switch 610, X1 provides output B and SPDT switch 610, X2 provides output A, which is connected to the PDU output, L1 with Neutral N connected to the PDU output L2 output. In an operational mode with a phase input A failure, SPDT switch 610, X1 provides output B and SPDT switch 610, X2 provides output C, which is connected to the PDU output, L1 with Neutral N connected to the PDU output L2 output. In an operational mode with a phase input B failure, SPDP switch 610, X1 provides output C and SPDT switch 610, X2 provides output A, which is connected to the PDU output, L1 with Neutral N connected to the PDU output L2 output. In an operational mode with a phase input C failure, SPDT switch 610, X1 provides output B and SPDT switch 610, X2 provides output B which is connected to the PDU output, L1 with Neutral N connected to the PDU output L2 output.

Figure 7:
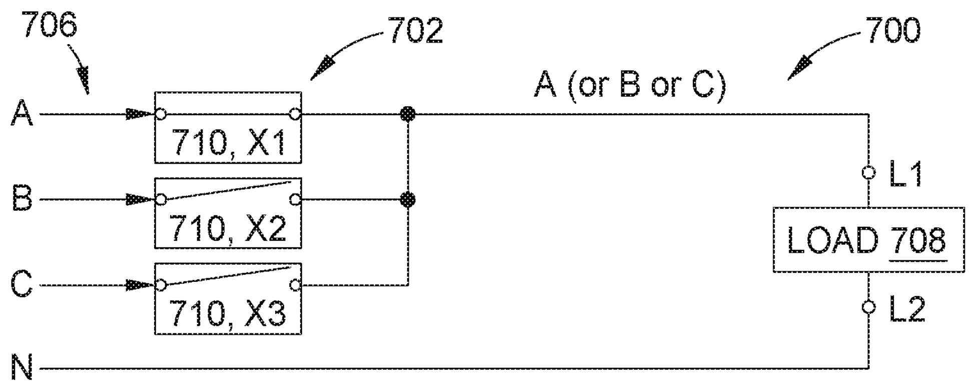
FIG. 7 is a schematic and block diagram illustrating another phase switching architecture of the PDU of FIG. 1 of a disclosed embodiment.

Referring to FIG. 7, shown is a phase switching architecture 700 of the PDU 150 of another disclosed embodiment. Phase switching architecture 700 provides phase redundancy, switching in an alternate input phase when a primary input phase fails. As shown, phase switching architecture 700 includes a switch bank 702 including three switches 710, X1, 710, X2, and 710, X3. In one embodiment, the switches 710 are SPST switches (such as Triac switches, IGBT switches, and MOSFET switches, or Relay switches). Phase switching architecture 700 supports a Wye (line-to-neutral) input voltage configuration or a Single Phase input. SPST switch 710, X1 receives power phase input 706, Phase A. SPST switch 710, X2 receives power phase input 706, Phase B. SPST switch 710, X3 receives power phase input 706, Phase C. SPST switches 710, X1, 710, X2, and 710, X3 provide an output A or B or C that is coupled to PDU output connection, L1 with Neutral N connected to the PDU connection output L2, supporting an associated load connection 708. As shown, phase switching architecture 700 includes one switch bank 702 supporting one load connection 708. However, a selected number of switch banks 702 is possible with each switch bank supporting a variable number of load connections 708.

Redundancy operation of phase switching architecture 700 and switch bank 702 includes switching in an alternate input phase when a primary input phase fails, for example operations as follows. In a normal operational mode, SPST switches 710, X1, X2 and X3 provide an output A or B or C. coupled to the PDU output connection, L1 with Neutral N connected to the PDU output connection L2 for the Wye power configuration. In an operational mode with a phase input A failure, SPST switches 710, X1, 710, X2, and 710, X3 provides an output of B or C that is coupled to PDU output connection, L1 with Neutral N connected to the PDU output connection, L2. In an operational mode with a phase input B failure, SPST switches 710, X1, 710, X2, and 710, X3 provides an output of A or C that is coupled to PDU output connection, L1 with Neutral N connected to the PDU output connection, L2. In an operational mode with a phase input C failure, SPST switches 710, X1, 710, X2, and 710, X3 provide an output of B or C that is coupled to PDU output connection, L1 with Neutral N connected to the PDU output connection, L2.

PDU architecture of PDU 150 of a disclosed embodiment enables advanced protection and diagnostic functions. Unlike typical PDUs, when protection is invoked, PDU 150 maintains operation by switching in a healthy phase instead of shutting down. PDU 150 can detect over-load conditions and protect both source and load by opening an affected switch. Each of excessive current (I), excessive power (I*V), or excessive energy (I*V*Time) can be used to define an over-load condition. With solid state IGBT or MOSFET switch implementations, a switch device can be controlled by a feedback loop such that load current is limited to a threshold value. Note that the switch device is dissipating high power in this mode, so the duration of current limiting must be limited. Predefined current limiting time may be used. Alternatively, the switch device energy can be measured to determine the best current limit duration. Current limiting can help avoid hair trigger disconnects and can also protect against upstream fuse or circuit breaker trips. The switch devices can be protected by using over-temperature shut-off. Temperature measurements can also be used to optimize over-load protection limits.

In FIGS. 8 and 9, switching control logic 160 combines the phase redundancy control logic 182, configuration control logic 184 and switching and functions control logic 186 performing the illustrated operations with switching control logic 160. For example, switching control logic 160 performs phase redundancy operations of phase redundancy control logic 182. Switching control logic 160 performs the Delta or Wye voltage configuration of configuration control logic 184. Switching control logic 160 performs switching and control functions with functions control logic 186, such as zero-voltage switching ZVS, and improved current balancing.

FIGS. 8A, 8B, and 8C and FIGS. 9A, 9B, and 9C respectively illustrate example operations performed by switching control logic 160 with a Delta voltage configuration and a Wye input power configuration of PDU 150. With universal input power configurations, switching control logic 160 automatically configures the Delta input power configuration, for example when the line-line voltage<threshold (for example, when the line-line voltage is less than the threshold voltage of 330V). Switching control logic 160 automatically configures the Wye input power configuration, for example when the line-neutral voltage>threshold voltage (for example, the line-neutral voltage is greater than a threshold voltage of 330V.)

Figure 8A:
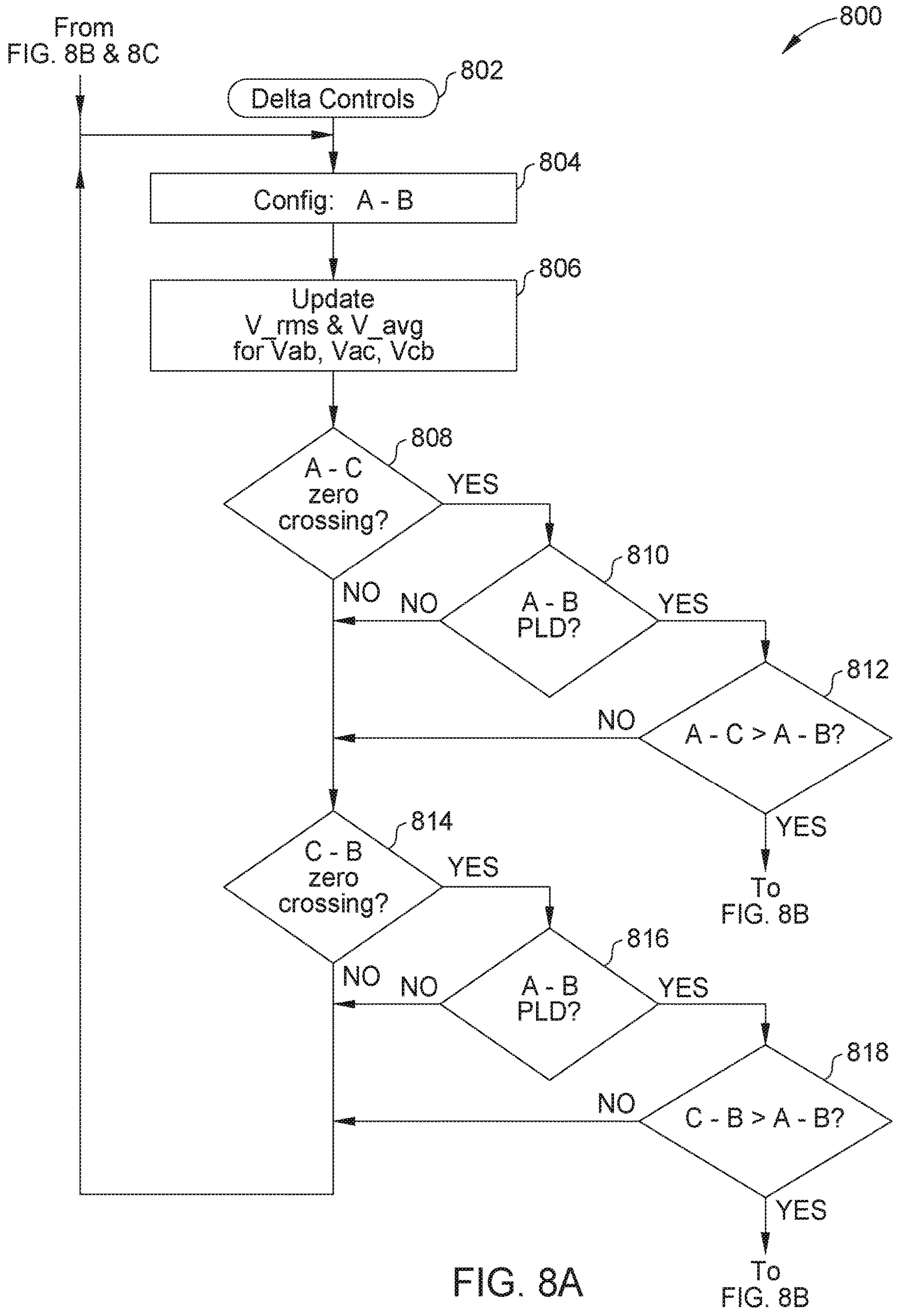
FIGS. 8A, 8B, and 8C together provide a flow diagram illustrating switching control logic for configuration and control functions of a switch bank with a Delta voltage configuration in phase switching architecture of PDU of FIG. 1 of a disclosed embodiment.
Figure 8B:
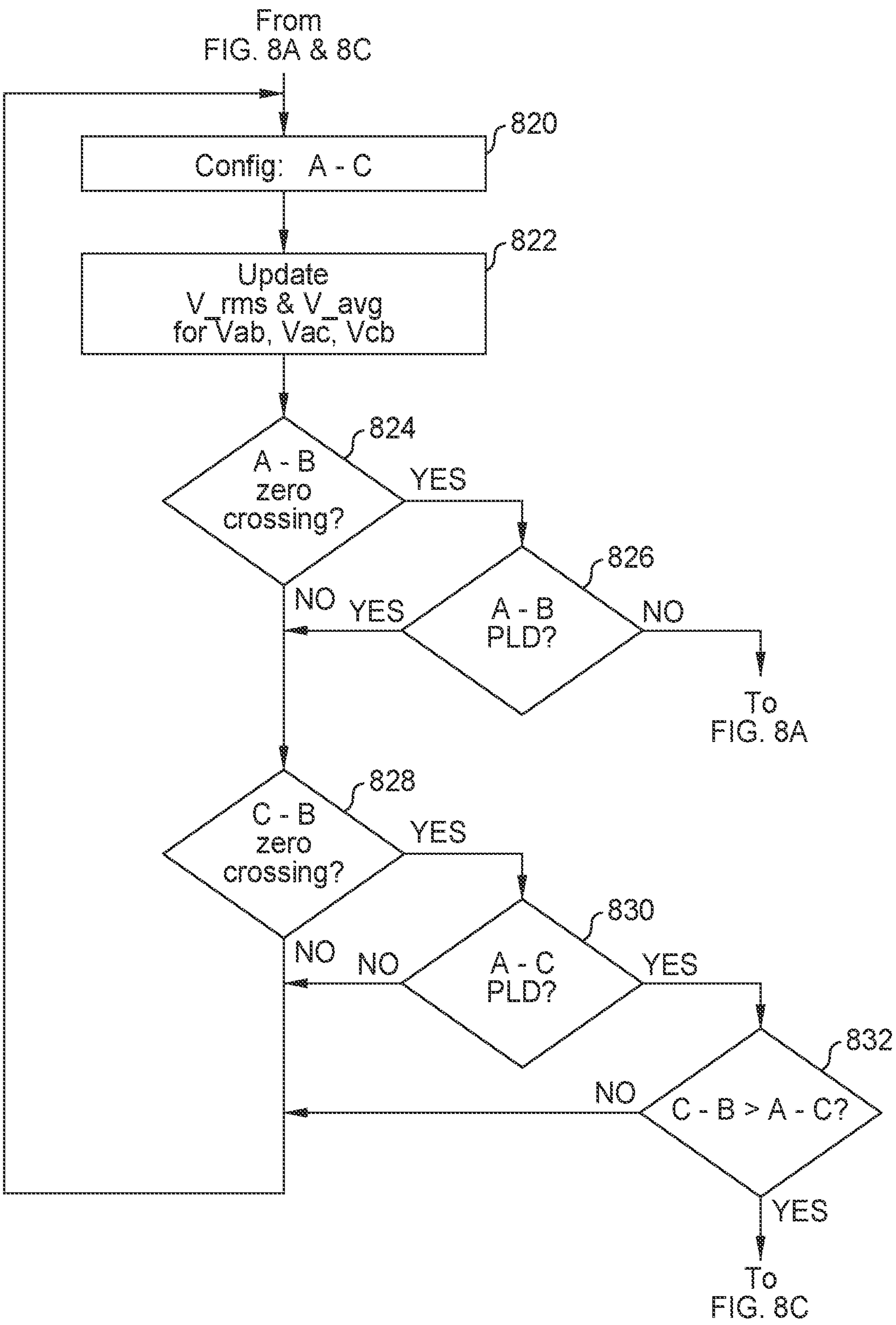
Figure 8C:
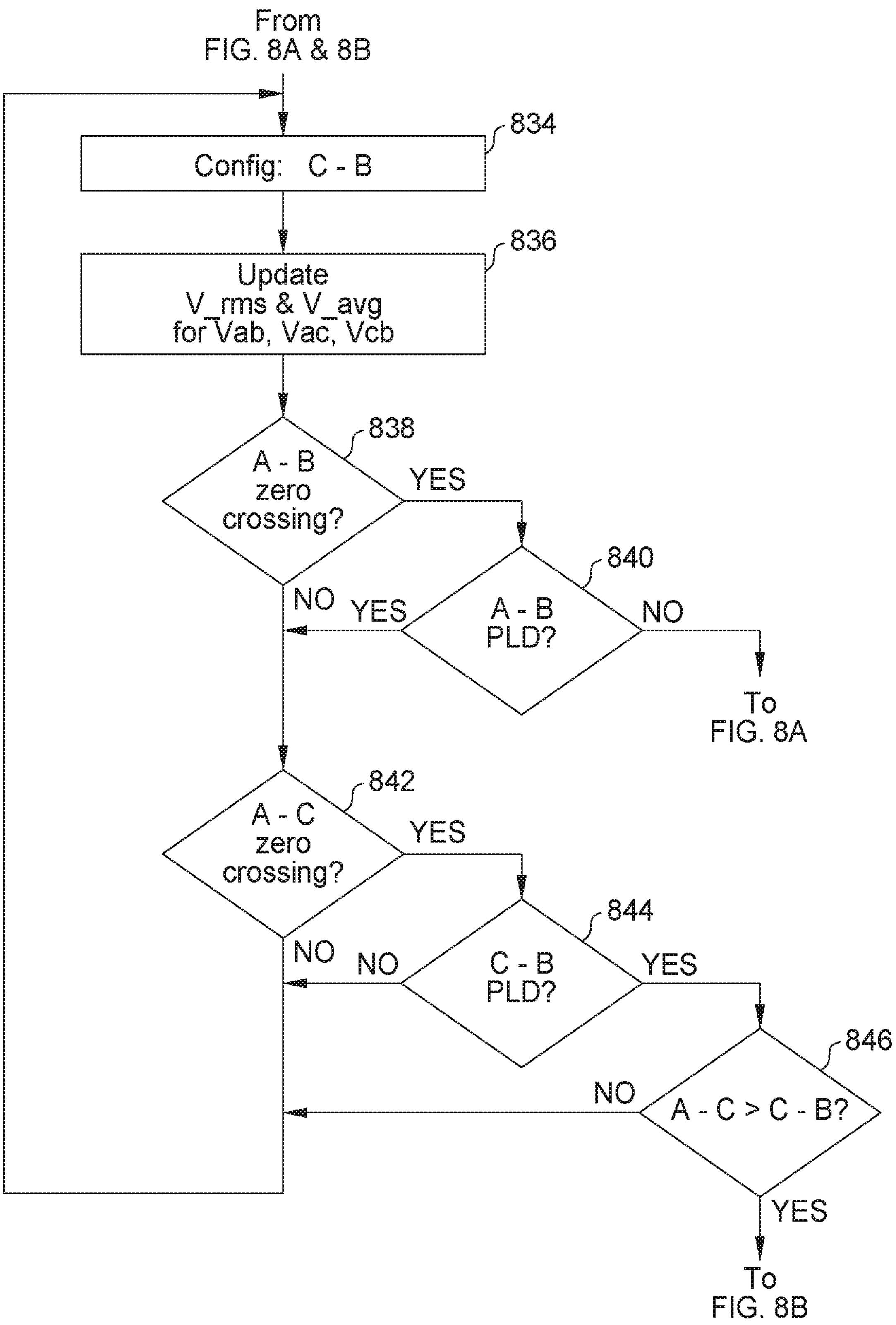

FIGS. 8A, 8B, and 8C illustrate example sensing and control operations 800 performed by switching control logic 160 to provide configuration and control functions of a switch bank with a Delta voltage configuration in phase switching architecture of PDU 150.

As shown in FIG. 8A, at block 802, switching control logic 160 starts to provide the Delta input power configuration for PDU 150. Switching control logic 160 at block 804 configures a primary no-fault or normal operational mode for the Delta input configuration. For example, switching control logic 160 configures the normal operational mode as shown in FIG. 2 with switch bank 202, X providing output AB, switch bank 202, Y providing output BC, and switch bank 202, Z providing output CA, each switch bank output connected to the respective PDU output connections, L1, L2 supporting the associated load 208.

Switching control logic 160 at block 806 updates values V_rms and V_avg for Vab, Vac, Vcb, where V_rms equals a single cycle root-mean-square (RMS) voltage and V_avg equals an average RMS voltage over many cycles. Switching control logic 160 at decision block 808 checks for a zero-voltage-crossing for A-C. When zero-voltage-crossing is identified at decision block 808, switching control logic 160 at decision block 810 checks for a Power Line Disturbance (PLD) on A-B. A PLD is detected where V_rms is less than a lower threshold value or V_ave is less than a higher threshold value.

PDU sensing control logic 160 maintains the connected load by switching input phases when the PLD is detected. When a PLD is identified on the primary configuration A-B, switching control logic 160 at decision block 812 checks whether A-C voltage is greater than the voltage of A-B. When A-C voltage is greater than the voltage of A-B, switching control logic 160 continues to block 820 in FIG. 8B and configures operational mode A-C. When a PLD is not identified on the primary configuration A-B, switching control logic 160 at decision block 814 checks for a zero-voltage-crossing for C-B. If A-C voltage is not greater than A-B, switching control logic 160 at decision block 814 checks for a zero-voltage-crossing for C-B. When the zero-voltage-crossing is not identified for C-B at decision block 814, Switching control logic 160 returns to block 804 in FIG. 8A, configuring the primary no-fault or normal operational mode A-B and continues. When the zero-voltage-crossing is identified for C-B at decision block 814, switching control logic 160 at decision block 816 checks for a PLD on the primary configuration A-B. When a PLD is not identified on the primary configuration A-B, switching control logic 160 returns to block 804 in FIG. 8A, configuring the primary no-fault or normal operational mode A-B and continues. When a PLD is identified on the primary configuration A-B, switching control logic 160 at decision block 818 checks whether C-B voltage is greater than A-B. If C-B voltage is not greater than A-B, switching control logic 160 returns to block 804 in FIG. 8A, configuring the primary no-fault or normal operational mode A-B and continues.

When determined at decision block 818 that C-B voltage is greater than voltage A-B voltage, switching control logic 160 continues to block 820 in FIG. 8B and configures operational mode A-C. Switching control logic 160 at block 822 updates values V_rms and V_avg for Vab, Vac, Vcb. Switching control logic 160 at decision block 824 checks for a zero-voltage-crossing for A-B. When a zero-voltage-crossing for A-B is identified at decision block 824, switching control logic 160 at decision block 826 checks for a Power Line Disturbance (PLD) on A-B. When a PLD is not identified on A-B at decision block 826, switching control logic 160 returns to block 804 in FIG. 8A, configuring normal mode A-B and continues. When a zero-voltage-crossing for A-B is not identified at decision block 824, switching control logic 160 at decision block 828 checks for a zero-voltage-crossing for C-B.

When a PLD is identified on A-B at decision block 826, switching control logic 160 at decision block 828 checks for a zero-voltage-crossing for C-B. When a zero-voltage-crossing is not identified for C-B at decision block 828, switching control logic 160 returns to block 820 in FIG. 8B, configuring mode A-C and continues. When a zero-voltage-crossing is identified for C-B at decision block 828, switching control logic 160 at decision block 830 checks for a PLD on A-C. When a PLD is not identified on A-C, switching control logic 160 returns to block 820 in FIG. 8B, configuring mode A-C and continues. When a PLD is identified on A-C, switching control logic 160 at decision block 832 checks whether C-B voltage is greater than voltage A-C. When C-B voltage is not greater than voltage A-C, operations return to block 820 in FIG. 8B, configuring mode A-C and continues.

When C-B voltage is greater than voltage A-C, operations continue to block 834 in FIG. 8C, and switching control logic 160 configures operational mode C-B. Switching control logic 160 at block 836 updates values V_rms and V_avg for Vab, Vac, Vcb. Switching control logic 160 at decision block 838 checks for a zero-voltage-crossing for A-B. When a zero-voltage-crossing for A-B is identified at decision block 838, switching control logic 160 at decision block 840 checks for a PLD on A-B. When a PLD is not identified on A-B at decision block 840, switching control logic 160 returns to block 804 in FIG. 8A, configures normal mode A-B and continues. When a zero-voltage-crossing for A-B is not identified at decision block 838, switching control logic 160 at decision block 842 checks for a zero-voltage-crossing for A-C. When a PLD is identified on A-B at decision block 840, switching control logic 160 at decision block 842 checks for a zero-voltage-crossing for A-C. When a zero-voltage-crossing for A-C is not identified at decision block 842, switching control logic 160 returns to block 834 in FIG. 8C, configures mode C-B and continues. When a zero-voltage-crossing for A-C is identified at decision block 842, switching control logic 160 at decision block 844 checks for a PLD on C-B. When a PLD is not identified on C-B at decision block 844, switching control logic 160 returns to block 834 in FIG. 8C, configures mode C-B and continues. When a PLD is identified on C-B at decision block 844, switching control logic 160 at decision block 846 checks whether A-C voltage is greater than voltage C-B. When A-C voltage is greater than voltage C-B, operations return to block 820 in FIG. 8B, configures mode A-C and continues. When A-C voltage is not greater than voltage C-B, operations return to block 834 in FIG. 8B, configures C-B and continues.

Figure 9A:
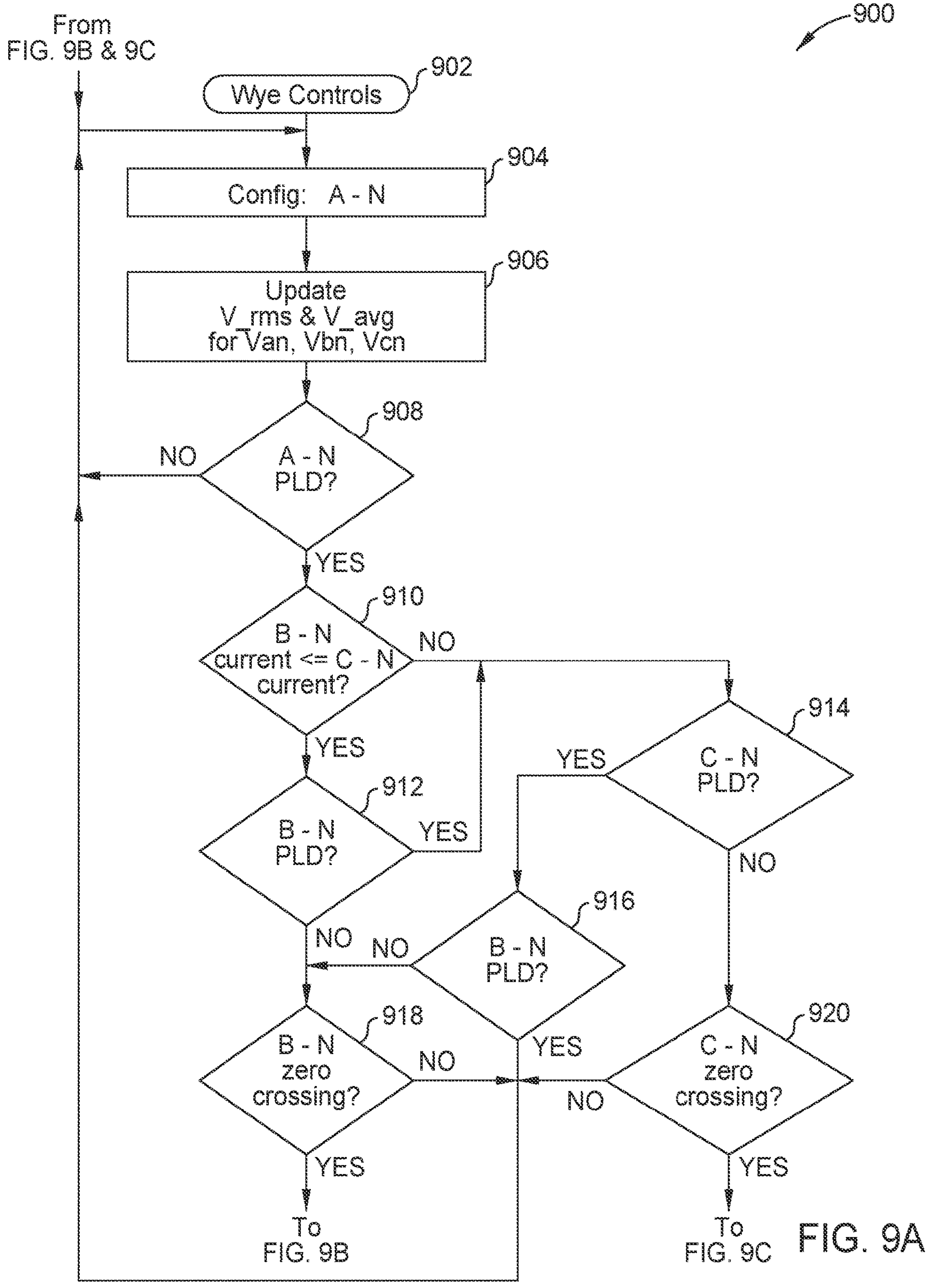
FIGS. 9A, 9B, and 9C together provide a flow diagram illustrating switching control logic providing configuration and control functions of a switch bank with a Wye voltage configuration in phase switching architecture of PDU of FIG. 1 of a disclosed embodiment.
Figure 9B:
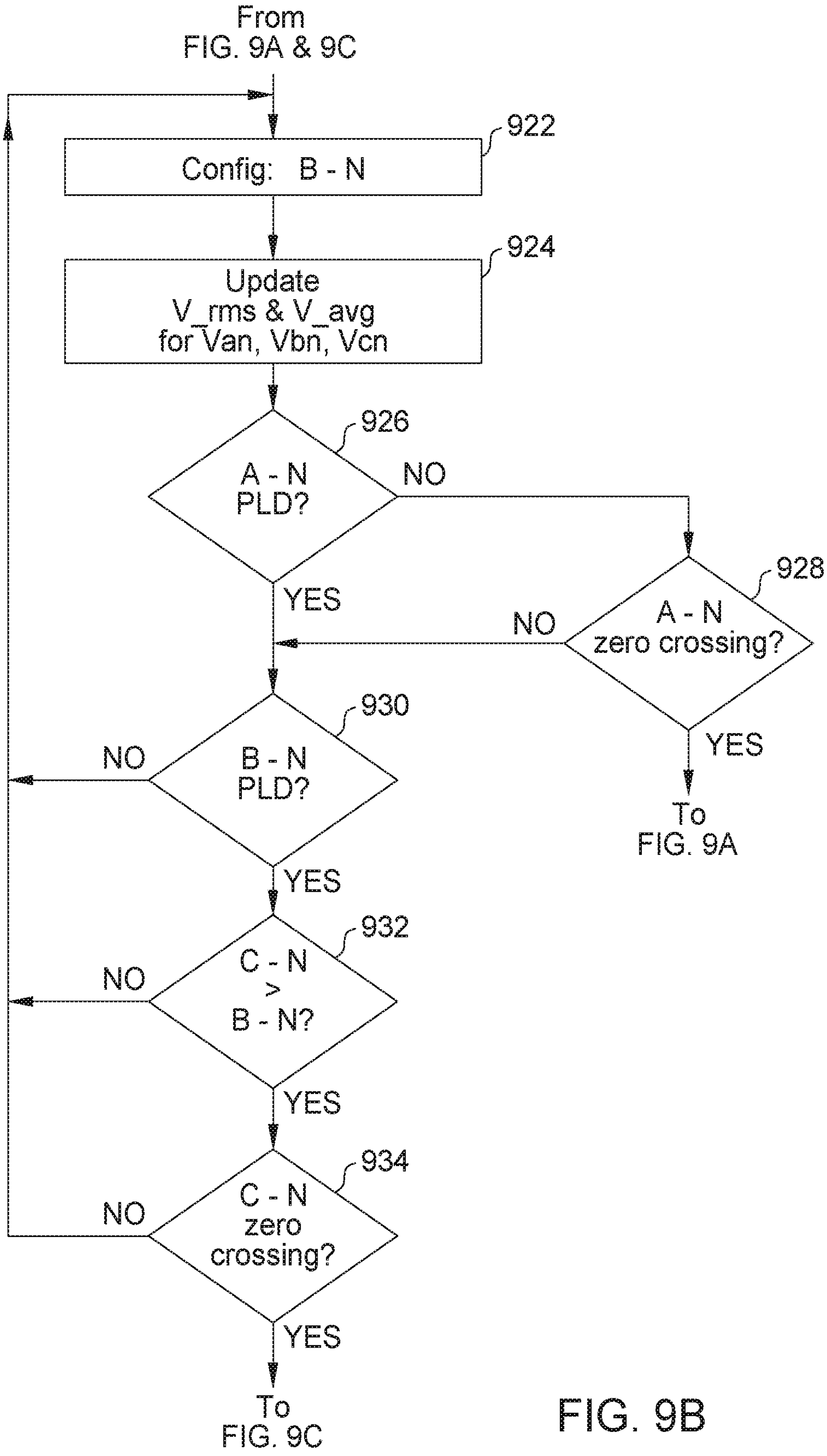
Figure 9C:
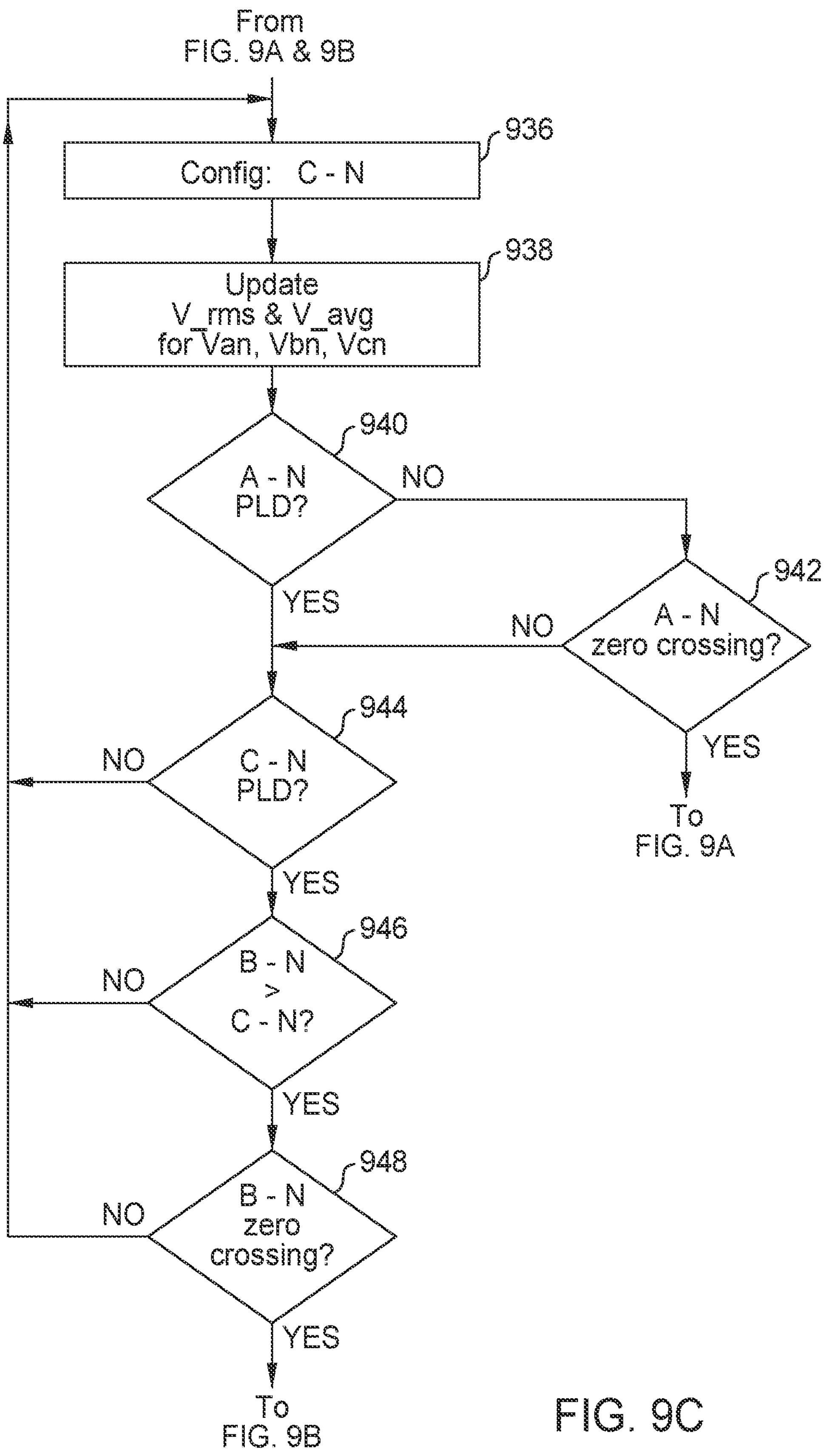

Referring to FIGS. 9A, 9B, and 9C, there is shown a flow chart illustrating example operations 900 performed by switching control logic 160 providing phase redundancy, configuration, and switching and function control with the Wye input voltage configuration of PDU 150.

Operations of switching control logic 160 begin at block 902 for Wye control. switching control logic 160 at block 904 configures a primary no-fault or normal configuration A-N. Switching control logic 160 at block 906 updates values V_rms and V_avg for Van, Vbn, Vcn. Switching control logic 160 at decision block 908 checks for a PLD on A-N. When a PLD is not identified on A-N at decision block 908, switching control logic 160 returns to block 904 in FIG. 9A, configuring normal mode A-N and continues. When a PLD is identified on A-N at decision block 908, switching control logic 160 at decision block 910 checks whether B-N current is less than or equal to C-N current. When B-N current is less than or equal to C-N current, switching control logic 160 at decision block 912 checks for a PLD on B-N. When B-N current is greater than C-N current, switching control logic 160 at decision block 914 checks for a PLD on C-N. When a PLD is identified on B-N at decision block 912, switching control logic 160 at decision block 914 checks for a PLD on C-N. When a PLD is identified on C-N at decision block 914, switching control logic 160 at decision block 916 checks for a PLD on B-N. When a PLD is identified on B-N at decision block 916 operation returns to block 904, configuring normal mode A-N and continues. When a PLD is not identified on B-N at decision block 912, switching control logic 160 at decision block 918 checks for a zero-voltage-crossing on B-N. When a PLD is not identified on B-N at decision block 916, switching control logic 160 at decision block 918 checks for a zero-voltage-crossing on B-N. When a zero-voltage-crossing for B-N is not identified at decision block 918, switching control logic 160 returns to block 904 in FIG. 9A, configuring normal mode A-N and continues. When a PLD is not identified on C-N at decision block 914, switching control logic 160 at decision block 920 checks for a zero-voltage-crossing on C-N. When a zero-voltage-crossing for C-N is identified at decision block 920, switching control logic 160 goes to block 936 in FIG. 9C, and configures mode C-N. When a zero-voltage-crossing for C-N is not identified at decision block 920, switching control logic 160 returns to block 904 in FIG. 9A, configuring normal mode A-N and continues.

When a zero-voltage-crossing for B-N is identified at decision block 918, switching control logic 160 at block 922 in FIG. 9B, configures mode B-N. Switching control logic 160 at block 924 updates values V_rms and V_avg for Van, Vbn, Vcn. Switching control logic 160 at decision block 926 checks for a PLD on A-N. When a PLD is not identified on A-N at decision block 926, Switching control logic 160 at decision block 928 checks for a zero-voltage-crossing on A-N. When a zero-voltage-crossing for A-N is identified at decision block 928, switching control logic 160 returns to block 904 in FIG. 9A, configures mode A-N and continues. When a zero-voltage-crossing for A-N is not identified at decision block 928, switching control logic 160 at decision block 930 checks for a PLD on B-N. When a PLD is identified on A-N at decision block 926, switching control logic 160 at decision block 930 checks for a PLD on B-N. When a PLD is identified on B-N at decision block 930, switching control logic 160 at decision block 932 checks whether C-N voltage is greater than B-N voltage. When C-N voltage is greater than B-N voltage switching control logic 160 at decision block 934 checks for a zero-voltage-crossing on C-N. When a PLD is not identified on B-N at decision block 930, switching control logic 160 returns to block 922 in FIG. 9B, configuring mode B-N and continues. When C-N voltage is not greater than B-N voltage at decision block 932, switching control logic 160 returns to block 922 in FIG. 9B, configuring mode B-N and continues. When a zero-voltage-crossing for C-N is not identified at decision block 934, switching control logic 160 returns to block 922 in FIG. 9B, configuring mode B-N and continues.

When a zero-voltage-crossing for C-N is identified at decision block 934 in FIG. 9B, switching control logic 160 goes to block 936 in FIG. 9C, and configures mode C-N. Switching control logic 160 at block 938 updates values V_rms and V_avg for Van, Vbn, Vcn. Switching control logic 160 at decision block 940 checks for a PLD on A-N. When a PLD is not identified on A-N at decision block 940, switching control logic 160 at decision block 942 checks for a zero-voltage-crossing on A-N. When a zero-voltage-crossing for A-N is identified at decision block 942, Switching control logic 160 returns to block 904 in FIG. 9A, configures A-N. When a zero-voltage-crossing for A-N is not identified at decision block 942, switching control logic 160 at decision block 944 checks for a PLD on C-N. When a PLD is identified on C-N at decision block 944, switching control logic 160 at decision block 946 checks whether B-N voltage is greater than C-N voltage.

When B-N voltage is greater than C-N voltage, switching control logic 160 at decision block 948 checks for a zero-voltage-crossing on B-N. When a zero-voltage-crossing for B-N is identified at decision block 948, switching control logic 160 returns to block 922 in FIG. 9B, configures B-N and continues. When a PLD is not identified on C-N at decision block 944, switching control logic 160 returns to block 936 in FIG. 9C, configuring mode C-N and continues. When B-N voltage is not greater than C-N voltage at decision block 946, switching control logic 160 returns to block 936 in FIG. 9C, configuring mode C-N and continues. When a zero-voltage-crossing for B-N is not identified at decision block 948, switching control logic 160 returns to block 936 in FIG. 9C, configuring mode C-N and continues.

FIGS. 10-14 provide respective example PDU switch architectures including different types of electrical switching devices SEs, 154 used to implement PDU 150. Different types of electrical switching devices SEs, 154 provide advantages and disadvantages depending upon the connected load and selected options for PDU 150.

Figure 10:
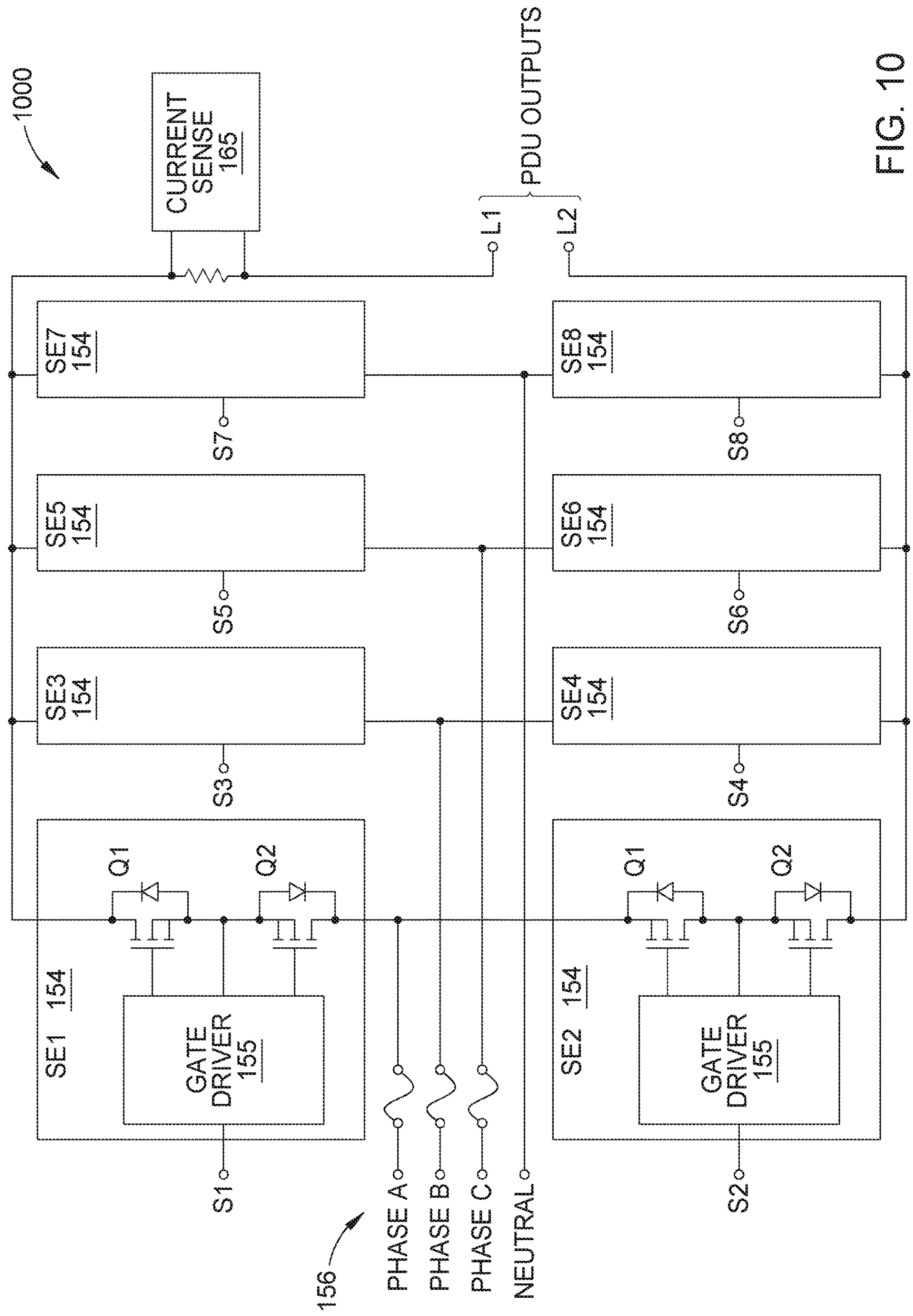
FIG. 10 is a schematic and block diagram illustrating a switch bank implemented by Metal Oxide Semiconductor Field Effect Transistor (MOSFET) switching devices in a phase switching architecture of the PDU of FIG. 1 of a disclosed embodiment.

Referring to FIG. 10, there is shown an example phase switching PDU architecture 1000 of disclosed embodiments of the PDU 150 with SEs, 154 implemented by Metal Oxide Semiconductor Field Effect Transistor (MOSFET) switching devices or MOSFET SEs 154.

As shown, the phase switching PDU architecture 1000 includes eight MOSFET SEs, 1-8 154. Each MOSFET SE 154 includes a pair of MOSFETs Q1, Q2, in a back-back configuration, a gate Driver 155, which receives a respective drive control input S1-S8 and provides a respective gate control output applied to the MOSFET gate of the associated pair of MOSFETs Q1, Q2 of the MOSFET SE 154. As shown, each MOSFET Q1, Q2 is an N-channel device and includes a body diode with the back-back MOSFET pair configuration provided to block AC current flow. The respective drive control input S1-S8 are applied to corresponding MOSFET gate Drivers 155, which control gate switching of associated MOSFET SEs, 1-8 154. MOSFET gate Drivers 155 can be implemented by various commercially available isolated drivers or by conventional opto-isolators. A current sensor 165 can provides a sensed signal 162 to switching control 160 for a current-limiting control and/or for telemetry data. The current sensor 165 can be placed at each MOSFET SE 154 or at the point of a load connection to PDU outputs L1, L2, as shown.

MOSFETs Q1, Q2 of MOSFET SEs, 1-8, 154 can operate bi-directionally, source to drain or drain to source. MOSFET SEs, 1 and 2, 154 are respectively connected as shown between Phase A input 156 and a respective PDU output L1, or L2. Similarly, MOSFET SEs, 3 and 4, 154 are respectively connected as shown between Phase B input 156 and a respective PDU output L1, or L2; MOSFET SEs, 5 and 6, 154 are respectively connected as shown between Phase C input 156 and a respective PDU output L1, or L2; and MOSFET SEs, 7 and 8, 154 are respectively connected as shown between the Neutral N input 156 for the Wye voltage configuration, and a respective PDU output L1, or L2.

MOSFET SEs, 1-8 154 provide fast switching without zero-crossing distortion, and can operate bi-directionally. MOSFET SEs, 1-8 154 provide instantaneous switch opening, eliminating the need to wait for zero crossing. MOSFET SEs, 1-8 154 provide high efficiency operation for smaller loads (saturation voltage Vsat vs. drain-source Rds), with lower efficiency provided for large loads. Lower cost options than MOSFET SEs are available for the SEs, 1-8 154.

Figure 11:
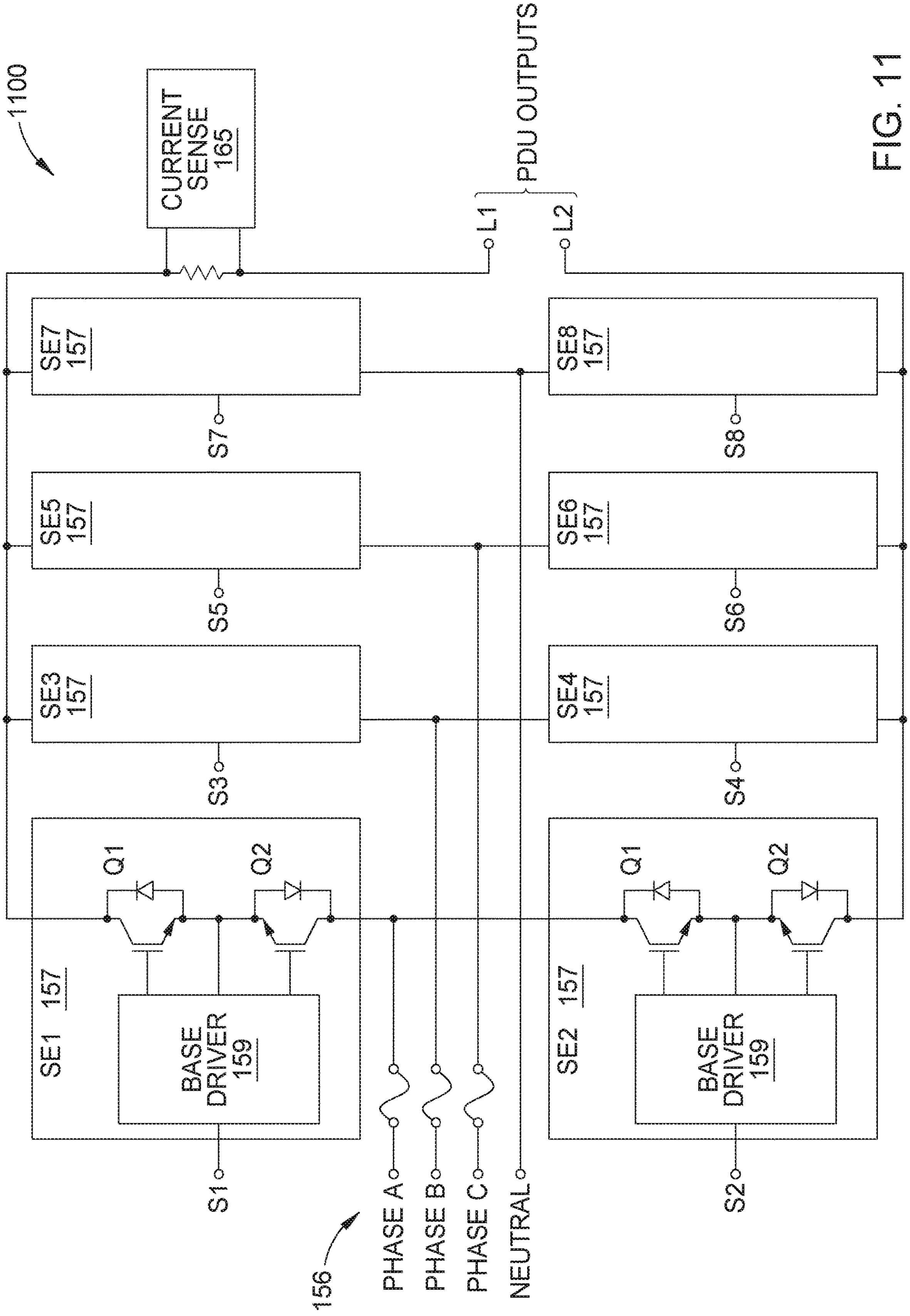
FIG. 11 is a schematic and block diagram illustrating a switch bank implemented by Insulated Gate Bipolar Transistor (IGBT) switching devices in a phase switching architecture of the PDU of FIG. 1 of a disclosed embodiment.

Referring to FIG. 11, there is shown an example phase switching PDU architecture 1100 of disclosed embodiments of the PDU 150 with SEs, 157 implemented by Insulated Gate Bipolar Transistor (IGBT) switching devices switching devices or IGBT SEs 157.

As shown, the phase switching PDU architecture 1100 includes eight IGBT SEs, 1-8, 157. Each IGBT SE 157 includes a pair of IGBTs Q1, Q2, in a back-back configuration, a base Driver 159, which receives a respective drive control input S1-S8 and provides a respective base control output applied to the IGBT base of associated pair of IGBTs Q1, Q2. The base Driver 159 of the phase switching PDU architecture 1100 can be implemented by various commercially available isolated drivers or by conventional opto-isolators, similar to gate Driver 159 of the phase switching PDU architecture 1000. As shown, IGBTs Q1 and Q2 are typically co-packaged with a diode which requires back-back configuration to block AC. A current sensor 165 similarly provides a sensed signal 162 to switching control 160 for a current-limiting control and telemetry data, and can be placed at each IGBT SE 157 or at the point of a load connection to PDU outputs L1, L2, as shown.

The IGBT implementation of the phase switching PDU architecture 1100 provides equivalent flexibility to the MOSFET implementation of the phase switching PDU architecture 1000. IGBTs Q1, Q2 of IGBT SEs, 1-8, 157 can operate bi-directionally, collector to emitter or emitter to collector, as shown. As shown, IGBT SEs, 1 and 2, 157 are connected as shown between Phase A input 156 and a respective PDU output L1, or L2. Similarly, IGBT SEs, 3 and 4, 157 are connected as shown between Phase B input 156 and a respective PDU output L1, or L2; IGBT SEs, 5 and 6, 157 are connected as shown between Phase C input 156 and a respective PDU output L1, or L2; and IGBT SEs, 7 and 8, 157 are connected as shown between the Neutral N input 156 used for the Wye voltage configuration, and a respective PDU output L1, or L2.

The IGBT implementation provides improved operational efficiency at higher power levels (saturation voltage Vsat vs. drain-source Rds). The IGBT SEs, 1-8, 157 provide medium fast switching and instantaneous switch opening (no need to wait for zero crossing) The IGBT implementation provides enhanced immunity to line voltage surges, and lower assembly cost than the MOSFET implementation of the phase switching PDU architecture 1000.

Figure 12:
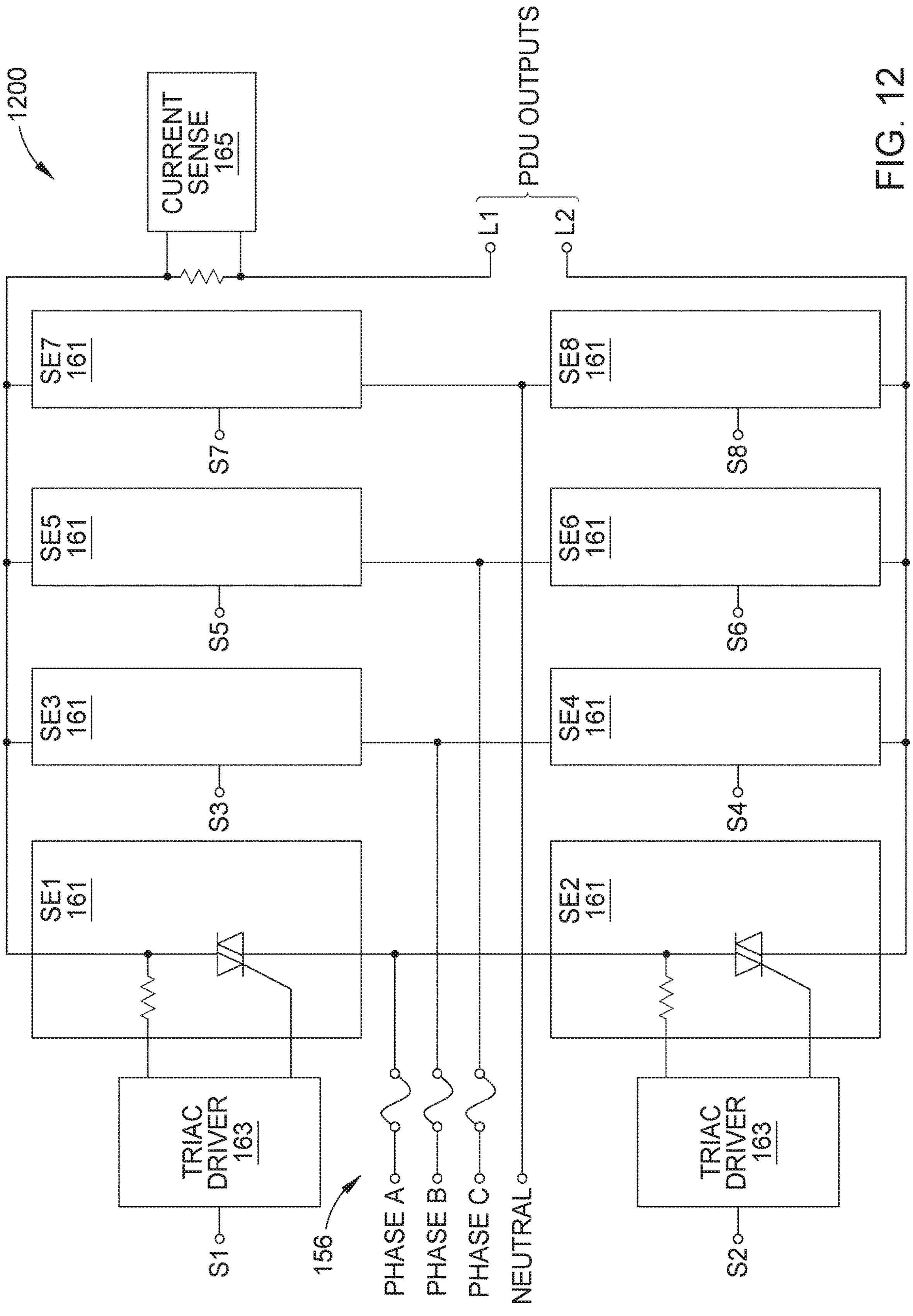
FIG. 12 is a schematic and block diagram illustrating a switch bank implemented by Triac switching devices in a phase switching architecture of the PDU of FIG. 1 of a disclosed embodiment.

Referring to FIG. 12, there is shown an example phase switching PDU architecture 1200 of disclosed embodiments of the PDU 150 with SEs, 161 implemented by Triac switching devices of disclosed embodiments.

As shown, the phase switching architecture 1200 includes eight Triac SEs, 1-8, 161 with associated opto-isolated Triac Drivers 163, each receiving a respective control input S1-S8. Various commercially available Triac drivers can implement the opto-isolated Triac Drivers 163. As shown, Triac SEs, 1 and 2, 161 are connected between Phase A input 156 and a respective PDU output L1, or L2. Similarly. Triac SEs, 3 and 4, 161 are connected between Phase B input 156 and a respective PDU output L1, or L2; Triac SEs, 5 and 6, 161 are connected between Phase C input 156 and a respective PDU output L1, or L2; and Triac SEs, 7 and 8, 154 are connected between the Neutral N input 156 used for the Wye voltage configuration, and a respective PDU output L1, or L2.

The Triac SEs, 1-8, 161 provide medium fast switching and inherently support bi-directional (AC) switching. The Triac implementation of the phase switching PDU architecture 1200 provides improved operational efficiency at higher loads, and lower efficiency for smaller loads. The Triac SEs, 1-8, 161 provide medium fast switching, lower cost than other switching devices, and offer enhanced immunity to line voltage surges and high-current events. The Triac SEs, 1-8, 161 can only be disabled at zero-crossing, and provide some zero-crossing distortion. The Triac SEs, 1-8, 161 can be disabled due to high-current events but must wait until zero-crossing.

Figure 13:
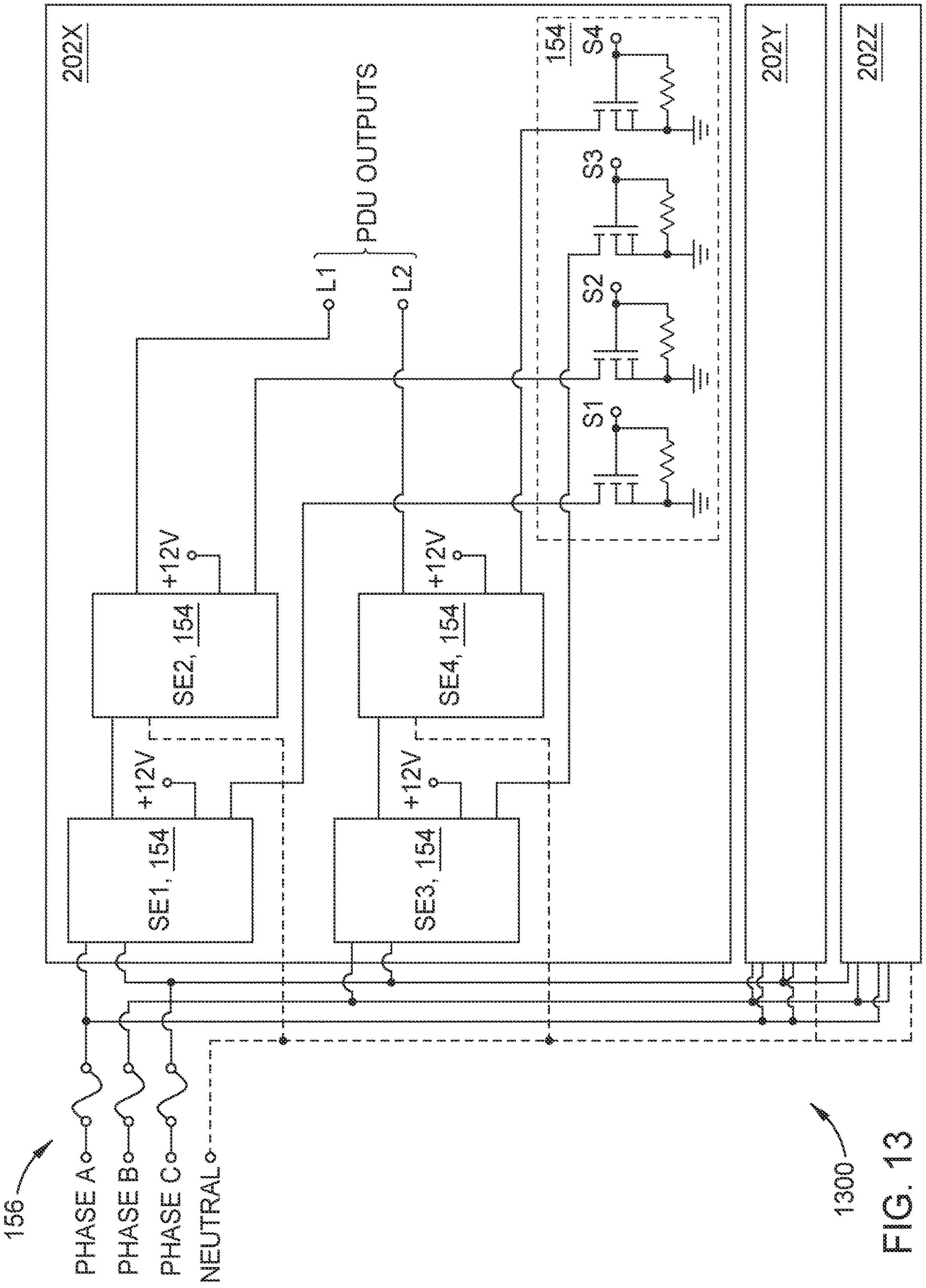
FIG. 13 is a schematic and block diagram illustrating a switch bank implemented by relay switching devices in a phase switching architecture of the PDU of FIG. 1 of a disclosed embodiment.

Referring to FIG. 13, shown is an example phase switching PDU architecture 1300 of disclosed embodiments of the PDU 150 with SEs, 154 implemented by relay switching devices.

As shown, the phase switching PDU architecture 1300 includes four Relay SEs, 1-8, 154 per switch bank 152, each with an associated transistor-switching controls 154, as shown. Each Triac switching control 154 receives a respective control input S1-S8 and provides a respective control output to relay SEs, 1-8, 154. A single-pole double-throw relay configuration implements the Relay SEs, 1-8, 154, minimizes the number of Relay SEs, 1-8, 154 used per switch bank 152.

Figure 14:
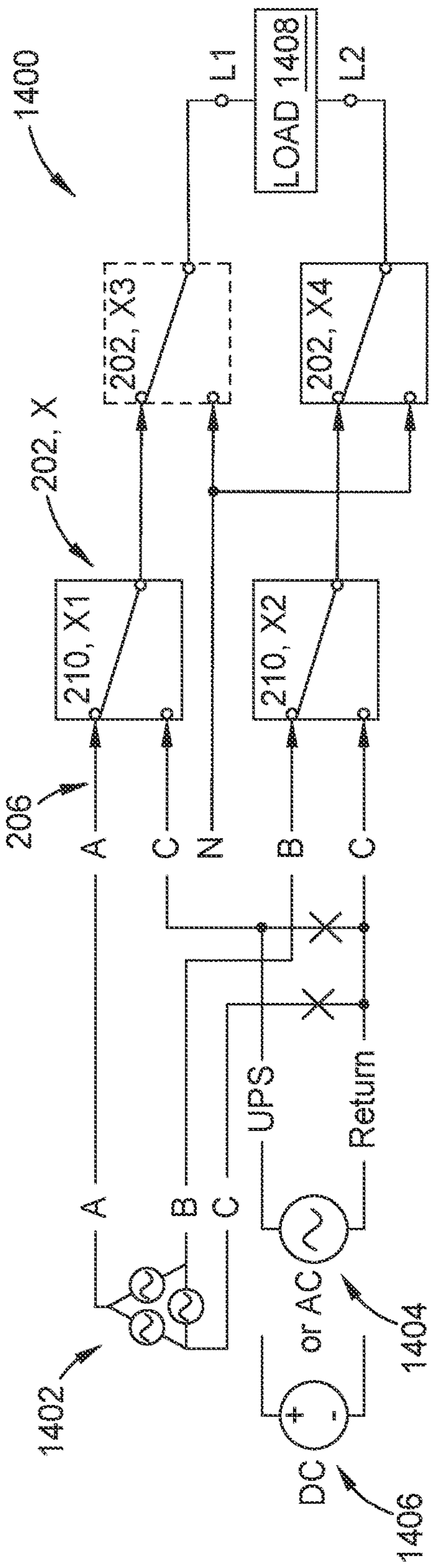
FIG. 14 is a schematic and block diagram illustrating a phase switching architecture supporting power input connections of an alternating current (AC) Universal Power Supply (UPS) or a direct current (DC) Battery to a switch bank with a Delta voltage configuration of the PDU of FIG. 1 of a disclosed embodiment.

Advantages of the relay implementation of the phase switching PDU architecture 1300 include Relay SEs, 1-8, 154 have no zero-crossing distortion, inherent electrical isolation between a relay coil and contact, high efficiency for all loads with no semiconductor losses, and high immunity to line voltage surges. Disadvantages of the relay implementation include relatively large size of the Relay SEs, 1-8, and the Relay SEs, 1-8, 154 provide relatively slow switching, and the relay SEs, 1-8, 154 are more likely to be damaged with excessive current prior to the relay opening. Relay SEs, 1-8, 154 also include mechanical wear-out mechanisms that can shorten relay life, FIG. 14 illustrates an example phase switching PDU architecture 1400 supporting power input connections of an AC Universal Power Supply (UPS) or a DC Battery input to the configurable PDU 150. The phase switching PDU architecture 1400 includes a Delta voltage source 1402. The phase switching PDU architecture 1400 enables an AC UPS 1404 or a DC Battery 1406 connection to a switch bank such as switch bank 202, X shown in FIG. 2. Switch bank 202, X includes four respective switches 210, X1-X4, comprising single-pole, double-throw (SPDT) switches. Power phase inputs 206, Phase A and Phase C are connected to SPDT switch 210, X1 and Power phase inputs 206, Phase B, and Phase C are connected to SPDT switch 210 X2. A respective output of SPDT switches 210, X1 and X2 and neutral input N are connected to SPDT switches 210, X3 and X4. Switch bank 202, X provides respective PDU outputs to L1, L2 connections, supplying power to the associated load 1408.

With a spare phase, such as a phase input C failure, instead of switching in an alternate healthy phase, the AC UPS 1404 or the DC Battery 1406 can replace the failed phase input C and be connected to the switch bank 302, X. For example, with all input phases A, B, and C functioning normally, respective switches 210, X1-X4 of switch bank 202, X are operatively controlled to connect input phase lines AB or (phase lines AC or phase lines CB) to the respective PDU output connections L1, L2.

To connect the AC UPS 1404 or the DC Battery 1406 to the switch bank 202, X, the phase input C connections to switches 210, X1 and X2 are disconnected or removed, indicated by Xs in the removed phase input C lines. The disconnected phase input C connections are replaced with connections to the AC UPS 1404 or DC Battery 1406. The UPS and Return legs of the AC UPS 1404, or connections of DC Battery 1406, are connected to respective switches 210, X1 and X2. After connection of the AC UPS 1404 or DC Battery 1406, the configurable PDU 150 continues reliable operations with Switch bank 202, X providing outputs to PDU output connections, L1, L2, supplying power to the associated load 1408. With Triac switches implementing switches 210, X1-X2, once fired the Triac switches will not disconnect from the connected DC Battery 1406 source.

Figure 15:
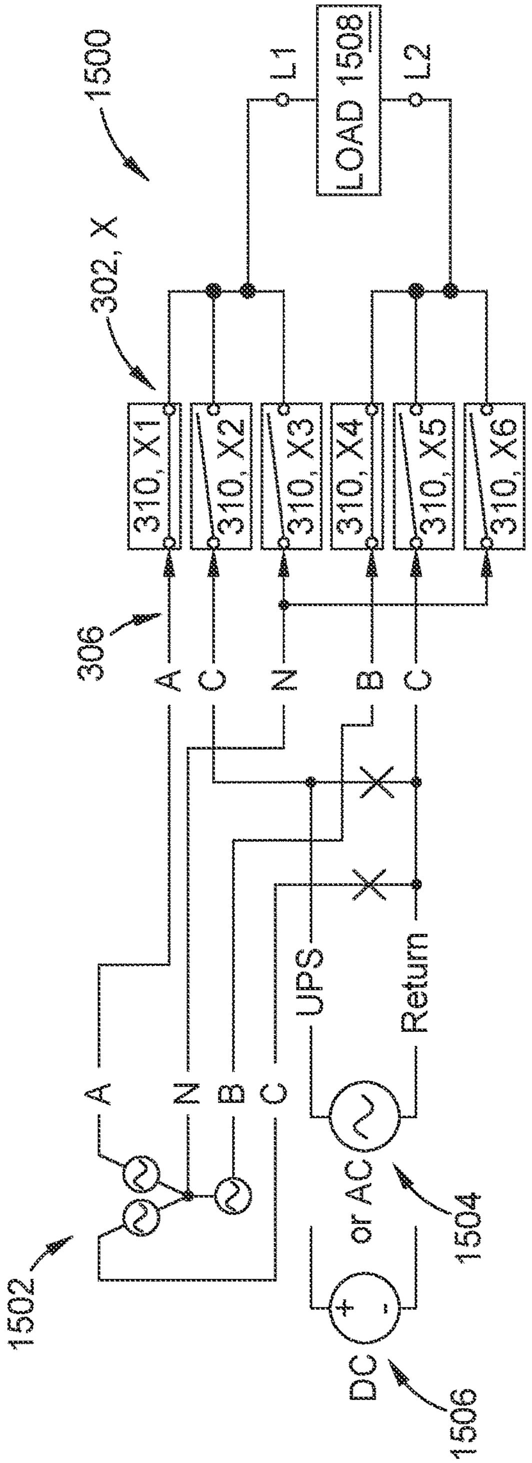
FIG. 15 is a schematic and block diagram illustrating a phase switching architecture supporting an AC UPS or a DC battery power input to a switch bank with a Wye voltage configuration of the PDU of FIG. 1 of a disclosed embodiment.

FIG. 15 illustrates a phase switching architecture 1500 supporting an AC UPS or a DC Battery power input connected to the configurable PDU 150. Phase switching architecture 1500 includes a Wye voltage configuration 1502. The configurable PDU architecture 1500 enables an input power connection to an AC UPS 1504 or a DC Battery 1506 to a switch bank such as switch bank 302, X shown in FIG. 3. Switch bank 302, X of configurable PDU architecture 1500 includes six switches 310, X1-X6, comprising SPST switches 310. Power phase inputs 306, Phase A, Phase B, and Phase C, and a neutral input N normally are connected respective SPST switches 310, X1-X6, as shown. In phase switching architecture 1500, respective SPST switches 310, X1-X6 are operatively controlled, providing respective outputs connected to PDU connections, L1, L2, supplying power to the associated load 1508.

For example, with all input phases A, B, and C functioning normally, respective SPST switches 310, X1-X6 of switch bank 302, X are operatively controlled to connect input phase-neutral lines AN or (phase-neutral lines BN or phase-neutral lines CN) to the respective PDU output connections L1, L2. With a phase input C failure, instead of switching in an alternate healthy phase, the AC UPS 1504 or the DC Battery 1506 can replace the failed phase input C and be connected to the switch bank 302, X.

To connect the AC UPS 1504 or the DC Battery 1506 to the switch bank 302, X, the phase input C connections to SPST switches 310, X2 and X5 are disconnected, indicated by Xs in phase input C lines. The disconnected phase C input connections are replaced with connections to the AC UPS 1504 or DC Battery 1506. As shown, the UPS and Return legs of the AC UPS 1504 or the DC Battery 1506 are connected to respective SPST switches 310, X2 and X5. After connection of the AC UPS 1504 or DC Battery 1506, the configurable PDU 150 continues reliable operations with Switch bank 302, X provides selected PDU outputs to connections L1, L2, supplying power to the associated load 1508. With Triac switches implementing SPST switches 310, X1-X6, once fired the Triac switches will not disconnect from the connected DC Battery 1506 source.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to FIG. 16, an example computing environment 100 is shown. Computing environment 100 contains an example of an environment for the execution of at least some of the computer code involved in performing the inventive methods, such as for performing switching control 160 for configurable PDU 150, such as phase redundancy control logic 182 controlling phase redundancy operations, configuration control logic 184 implementing multiple configurable phase switching architectures of PDU 150 and switching and function control logic 184 for example providing enhancements like Zero Voltage Switching (ZVS) and inrush control at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 16. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

While the foregoing is directed to embodiments of the present invention, other and further embodiments of the invention may be devised without departing from the basic scope thereof, and the scope thereof is determined by the claims that follow.

What is claimed is:

1. A power distribution unit (PDU) comprising:
 a configurable PDU architecture implementing phase redundancy comprising:
  a switch bank comprising primary power phase inputs Phase A, Phase B, Phase C, and power phase outputs connected to one or more loads;
  a switching control configured to receive sense inputs from the switch bank and operatively configure the switch bank responsive to the sense inputs; and
  wherein the switch bank switches to an alternate power phase input, responsive to a failure of a primary input phase input.

2. The PDU of claim 1, wherein the switch bank switches to the alternate power phase input responsive to a Phase A input phase failure, and wherein the switch bank switches to an alternate power phase of Phase B or Phase C.

3. The PDU of claim 1, wherein the switch bank switches to the alternate power phase input responsive to a Phase B input phase failure, and wherein the switch bank switches to an alternate power phase of Phase A or Phase C.

4. The PDU of claim 1, wherein the switch bank switches to the alternate power phase input responsive to a Phase C input phase failure, and wherein the switch bank switches to an alternate power phase of Phase A or Phase B.

5. The PDU of claim 1, further comprises a Neutral power input connected to the switch bank, wherein the configurable PDU architecture supports Single phase, Delta, and Wye configurations, and wherein the Neutral power input is used with an input power Wye-configuration.

6. The PDU of claim 1, the configurable PDU architecture supports an input connection to the switch bank of an alternating current (AC) Universal Power Supply (UPS) or a direct current (DC) Battery.

7. The PDU of claim 1, wherein the switch bank of the configurable PDU architecture comprises a plurality of electrical switching devices operatively controlled by the switching control to configure the switch bank responsive to the sense inputs.

8. The PDU of claim 7, wherein the plurality of electrical switching devices comprise single-pole, double-throw (SPDT) switches, and wherein the SPDT switches are break-before-make type switches.

9. The PDU of claim 1, wherein the plurality of electrical switching devices comprise single-pole, single-throw (SPST) switches, and wherein one of the SPST switches is used in a switch leg connected in series with the one or more loads.

10. The PDU of claim 1, wherein the switch bank of the configurable PDU architecture comprises Metal Oxide Semiconductor Field Effect Transistor (MOSFET) switches.

11. The PDU of claim 1, wherein the switch bank of the configurable PDU architecture comprises a plurality of relays, and wherein the relays comprising a break-before-make relay type.

12. The PDU of claim 1, wherein the switch bank of the configurable PDU architecture comprises Triac switches.

13. The PDU of claim 1, wherein the switch bank of the configurable PDU architecture comprises Insulated Gate Bipolar Transistor (IGBT) switches.

14. The PDU of claim 1, wherein the configurable PDU architecture enables dynamic configuration switching of PDU outputs to connected loads to improve phase balancing of the connected loads.

15. The PDU of claim 1, wherein the switch bank uses Zero Voltage Switching (ZVS) when the switch bank switches in the alternate power phase input and a switch voltage equals zero.

16. The PDU of claim 1, wherein the switch bank detects the primary input phase failure by identifying a Power Line Disturbance (PLD) on the primary input phase.

17. The PDU of claim 1, wherein the switch bank switches provides inrush control when the switch bank switches in the alternate power phase input, wherein providing the inrush control comprises combining Zero-crossing detection with a varied switch firing phase angle to control both the voltage magnitude and the connection time between a load and a source to limit the current flow from the source to the load.

18. The PDU of claim 17, wherein the switching control uses predefined voltage threshold and predefined current threshold values to implement load protection for the load.

19. A computer-implemented method for implementing phase redundancy in a power distribution unit (PDU), the PDU comprises a configurable PDU architecture, the method comprising:
 providing a switch bank having primary power phase inputs of Phase A, Phase B, Phase C, Neutral, and power phase outputs connected to a load;
 providing a switching control configured to receive sense inputs from the switch bank and operatively configure the switch bank responsive to the sense inputs; and
 configuring the switch bank to switch in an alternate power phase input, responsive to a failure of one of the primary power phase inputs.

20. A computer program product for implementing phase redundancy control of a configurable power distribution unit (PDU), the configurable PDU comprises a switch bank comprising primary power phase inputs of Phase A, Phase B, Phase C, Neutral, and power phase outputs connected to a load, the computer program product comprising:
 a non-transitory computer-readable storage medium having computer-readable program code embodied therewith, the computer-readable program code executable by one or more computer processors to perform an operation comprising:
  configuring a switching control to receive sense inputs from the switch bank and operatively configure the switch bank responsive to the sense inputs; and
  wherein the switching control configures the switch bank to switch in an alternate power phase input, responsive to a failure of one of the primary power phase inputs.

* * * * *